United States Patent
Hampel et al.

(10) Patent No.: US 11,368,972 B2
(45) Date of Patent: Jun. 21, 2022

(54) RECEIVER-SIDE BUFFERING FOR TIME-AWARE SCHEDULING ACROSS CELLULAR LINK

(71) Applicant: QUALCOMM Incorporated, San Diego, CA (US)

(72) Inventors: Karl Georg Hampel, Hoboken, NJ (US); Junyi Li, Chester, NJ (US); Rajat Prakash, San Diego, CA (US); Peerapol Tinnakornsrisuphap, San Diego, CA (US); Satashu Goel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/272,647

(22) Filed: Feb. 11, 2019

(65) Prior Publication Data
US 2019/0254057 A1 Aug. 15, 2019

Related U.S. Application Data

(60) Provisional application No. 62/630,432, filed on Feb. 14, 2018.

(51) Int. Cl.
*H04W 72/12* (2009.01)
*H04W 56/00* (2009.01)
(Continued)

(52) U.S. Cl.
CPC ....... *H04W 72/1289* (2013.01); *H04J 3/0635* (2013.01); *H04L 47/24* (2013.01);
(Continued)

(58) Field of Classification Search
CPC .............. H04W 72/1289; H04W 28/02; H04W 28/0278; H04W 56/001; H04W 72/1242;
(Continued)

(56) References Cited

U.S. PATENT DOCUMENTS 7,426,206 B1 * 9/2008 Ofek ................... H04L 12/6418
370/389
9,173,180 B2 * 10/2015 Philips ................ H04W 56/001
(Continued)

FOREIGN PATENT DOCUMENTS

EP 0510290 A1 10/1992
EP 0535860 A2 4/1993

OTHER PUBLICATIONS

International Search Report and Written Opinion—PCT/US2019/017690—ISA/EPO—dated Apr. 11, 2019.

*Primary Examiner* — Nishant Divecha
(74) *Attorney, Agent, or Firm* — Qualcomm Incorporated

(57) ABSTRACT

Apparatus and methods of wireless communications include, at a receiving node, receiving timing information corresponding to a traffic class identifier. The timing information being associated with a time interval for communicating data of a traffic class corresponding to the traffic class identifier. Aspects include receiving traffic data pertaining to the traffic class, determining that the traffic data was transmitted or is received outside the time interval, and then buffering the traffic data. Additionally, aspects include forwarding the traffic data in response to a next occurrence of the time interval. A transmitting node may be configured with complimentary functions.

30 Claims, 14 Drawing Sheets

(51) Int. Cl.
  *H04W 28/02* (2009.01)
  *H04L 47/30* (2022.01)
  *H04L 47/24* (2022.01)
  *H04L 47/722* (2022.01)
  *H04J 3/06* (2006.01)
  *H04L 47/32* (2022.01)

(52) U.S. Cl.
  CPC .............. *H04L 47/30* (2013.01); *H04L 47/32* (2013.01); *H04L 47/722* (2013.01); *H04W 28/02* (2013.01); *H04W 28/0278* (2013.01); *H04W 56/001* (2013.01); *H04W 72/1242* (2013.01)

(58) Field of Classification Search
  CPC ......... H04W 56/0005; H04W 56/0035; H04W 56/004; H04W 56/0055; H04W 72/00; H04W 74/00; H04W 76/00; H04L 47/722; H04L 47/32; H04L 47/24; H04L 47/30; H04L 5/003; H04L 5/0094; H04L 5/0096; H04L 65/00; H04L 47/801; H04L 49/206; H04L 45/3065; H04L 47/2416; H04J 3/0635
  See application file for complete search history.

(56) References Cited

U.S. PATENT DOCUMENTS

| | | | |
|---|---|---|---|
| 10,958,563 | B2* | 3/2021 | Craciunas ........... H04L 41/0873 |
| 2007/0081498 | A1* | 4/2007 | Niwano .................. H04L 47/10 |
| | | | 370/335 |
| 2015/0365338 | A1* | 12/2015 | Pannell ................. H04L 49/253 |
| | | | 370/412 |
| 2016/0066316 | A1 | 3/2016 | Bhushan et al. |
| 2016/0286487 | A1* | 9/2016 | Sachs ................ H04W 52/0229 |
| 2018/0316592 | A1* | 11/2018 | Ellegaard ................ H04L 43/50 |
| 2020/0163075 | A1* | 5/2020 | Mukkavilli ........... H04L 5/0048 |

* cited by examiner

600

```
         FROM
         FIG. 6, #608
              │
              ▼                                              610
┌─────────────────────────────────────────────────────────────────┐
│ Receiving timing information corresponding to a traffic class    │
│ identifier, wherein the timing information is associated with a  │
│ time interval for communicating data of a traffic class          │
│ corresponding to the traffic class identifier                    │
│                                                                  │
│         610a                              610b                   │
│  ┌─────────────────────────┐   ┌─────────────────────────────┐  │
│  │ Receiving identification │   │ Receiving a time indicator, │  │
│  │ of the time interval     │   │ included with traffic data, │  │
│  │ referenced to a          │   │ identifying a next          │  │
│  │ synchronized clock       │   │ occurrence of the time      │  │
│  │                          │   │ interval                    │  │
│  └─────────────────────────┘   └─────────────────────────────┘  │
└─────────────────────────────────────────────────────────────────┘
              │                                              612
              ▼
┌─────────────────────────────────────────────────────────────────┐
│ Allocating a traffic data buffer in a memory in response to      │
│ receiving the timing information corresponding to the traffic    │
│ class identifier                                                 │
└─────────────────────────────────────────────────────────────────┘
              │                                              614
              ▼
┌─────────────────────────────────────────────────────────────────┐
│       Receiving traffic data pertaining to the traffic class     │
│              (optionally, including indicator)                   │
└─────────────────────────────────────────────────────────────────┘
              │                                              616
              ▼
┌─────────────────────────────────────────────────────────────────┐
│ Determining that the traffic data was transmitted or is received │
│ outside the time interval                                        │
│                                                                  │
│         616a                              616b                   │
│  ┌─────────────────────────┐   ┌─────────────────────────────┐  │
│  │ Determining based on a   │   │ Determining based on a      │  │
│  │ value of the             │   │ value of the time indicator │  │
│  │ synchronized clock not   │   │ relative to a value of a    │  │
│  │ matching a value of the  │   │ synchronized clock that is  │  │
│  │ time interval            │   │ synchronized to the time    │  │
│  │                          │   │ interval                    │  │
│  └─────────────────────────┘   └─────────────────────────────┘  │
└─────────────────────────────────────────────────────────────────┘
              │
              ▼
         GO TO
         FIG. 8, #618
```

*FIG. 7*

RECEIVER-SIDE BUFFERING FOR TIME-AWARE SCHEDULING ACROSS CELLULAR LINK

CLAIM OF PRIORITY UNDER 35 U.S.C. § 119

This application claims priority to U.S. Provisional Application No. 62/630,432, titled "RECEIVER-SIDE BUFFERING FOR TIME-AWARE SCHEDULING ACROSS CELLULAR LINK," filed Feb. 14, 2018, which is assigned to the assignee hereof, and incorporated herein by reference in its entirety.

BACKGROUND

Aspects of the present disclosure relate generally to wireless communication networks, and more particularly, to receiver-side buffering of received traffic data associated with time-aware scheduling across a cellular communication link.

Factory automation relies on ultra-reliable low latency communications (URLLC) for hard-real-time applications such as motion control, discrete manufacturing, etc. The present wireline solutions use Ethernet-based protocols over local area networks (LANs). Time-sensitive networking (TSN) summarizes a set of 802.1 features that support hard-real-time traffic for these use cases. Time-aware scheduling is one of the predominant features of TSN. It reserves absolute periodic time intervals for the transmission of a particular traffic class on a link.

One problem associated with time-aware-scheduling is that it increases buffer requirements on the transmitter side since traffic cannot be transmitted outside its designated time window, even if link capacity is available. This buffer requirement may create a burden on some devices, such as small sensors having constrained memory resources or devices with relatively large memory resources but transmitting traffic to a large number of receiving devices.

Thus, improvements in time-aware scheduling are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, such as at a receiving node, the present disclosure includes a method of wireless communications that may include receiving timing information corresponding to a traffic class identifier, wherein the timing information is associated with a time interval for communicating data of a traffic class corresponding to the traffic class identifier. The method may include receiving traffic data pertaining to the traffic class, and determining that the traffic data was transmitted or is received outside the time interval. Also, the method may include buffering the traffic data in response to the traffic data being transmitted or received outside the time interval. Additionally, the method may include forwarding the traffic data in response to a next occurrence of the time interval.

In another aspect, also at a receiving node, the present disclosure includes a second method of wireless communications that may include receiving a set of one or more time intervals referenced to a first clock together with a traffic class identifier corresponding to a traffic class. The second method may include receiving traffic data pertaining to the traffic class. The second method may include determining that the traffic data was transmitted or is received outside the one or more time intervals. The second method may include buffering the traffic data. The second method may include forwarding the traffic data when a next time interval arrives. In an aspect, the second method may further include receiving a request for receiver side buffering.

In another aspect, also at a receiving node, the present disclosure includes a third method of wireless communications that may include receiving a traffic class identifier corresponding to a traffic class. The third method may include receiving traffic data pertaining to the traffic class together with a time indicator. The third method may include buffering the traffic data. The third method may include determining a time frame from the time indicator. The third method may include forwarding the traffic data after the time frame has passed. In an aspect, the third method may further include receiving a request for receiver side buffering.

In another aspect, such as at a transmitting node, the present disclosure includes a method of wireless communications that may include transmitting timing information corresponding to a traffic class identifier, wherein the timing information is associated with a time interval for communicating data of a traffic class corresponding to the traffic class identifier. The method may include receiving traffic data pertaining to the traffic class, and determining that the traffic data is received outside the time interval. Additionally, the method may include transmitting the traffic data outside of the time interval based on the transmitting of the timing information corresponding to the traffic class identifier.

In another aspect, the disclosure provides a receiving node device including a memory and a processor in communication with the memory. The processor may be configured to receive timing information corresponding to a traffic class identifier, wherein the timing information is associated with a time interval for communicating data of a traffic class corresponding to the traffic class identifier. The processor may be configured to receive traffic data pertaining to the traffic class. The processor may be configured to determine that the traffic data was transmitted or is received outside the time interval. The processor may be configured to buffer the traffic data in response to the traffic data being transmitted or received outside the time interval. The processor may be configured to forward the traffic data in response to a next occurrence of the time interval.

In another aspect, the disclosure provides another receiving node device. The receiving node device may include means for receiving timing information corresponding to a traffic class identifier, wherein the timing information is associated with a time interval for communicating data of a traffic class corresponding to the traffic class identifier. The receiving node device may include means for receiving traffic data pertaining to the traffic class. The receiving node device may include means for determining that the traffic data was transmitted or is received outside the time interval. The receiving node device may include means for buffering the traffic data in response to the traffic data being transmitted or received outside the time interval. The receiving node device may include means for forwarding the traffic data in response to a next occurrence of the time interval.

In another aspect, the disclosure provides a non-transitory computer-readable medium storing computer-executable code that when executed by a processor of a receiving node device causes the processor to receive timing information corresponding to a traffic class identifier, wherein the timing information is associated with a time interval for communicating data of a traffic class corresponding to the traffic class identifier. The non-transitory computer-readable medium may include code to receive traffic data pertaining to the traffic class. The non-transitory computer-readable medium may include code to determine that the traffic data was transmitted or is received outside the time interval. The non-transitory computer-readable medium may include code to buffer the traffic data in response to the traffic data being transmitted or received outside the time interval. The non-transitory computer-readable medium may include code to forward the traffic data in response to a next occurrence of the time interval.

In another aspect, the disclosure provides a transmitting node device including a memory and a processor in communication with the memory. The processor may be configured to transmit timing information corresponding to a traffic class identifier, wherein the timing information is associated with a time interval for communicating data of a traffic class corresponding to the traffic class identifier. The processor may be configured to receive traffic data pertaining to the traffic class. The processor may be configured to determine that the traffic data is received outside the time interval. The processor may be configured to transmit the traffic data outside of the time interval based on the transmitting of the timing information corresponding to the traffic class identifier.

In another aspect, the disclosure provides another transmitting node device. The transmitting node device may include means for transmitting timing information corresponding to a traffic class identifier, wherein the timing information is associated with a time interval for communicating data of a traffic class corresponding to the traffic class identifier. The transmitting node device may include means for receiving traffic data pertaining to the traffic class. The transmitting node device may include means for determining that the traffic data is received outside the time interval. The transmitting node device may include means for transmitting the traffic data outside of the time interval based on the transmitting of the timing information corresponding to the traffic class identifier In another aspect, the disclosure provides a non-transitory computer-readable medium storing computer-executable code that when executed by a processor of a transmitting node device causes the processor to transmit timing information corresponding to a traffic class identifier, wherein the timing information is associated with a time interval for communicating data of a traffic class corresponding to the traffic class identifier. The non-transitory computer-readable medium may include code to receive traffic data pertaining to the traffic class. The non-transitory computer-readable medium may include code to determine that the traffic data is received outside the time interval. The non-transitory computer-readable medium may include code to transmit the traffic data outside of the time interval based on the transmitting of the timing information corresponding to the traffic class identifier.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIGS. 6-8 are flow diagrams of an example method performed by a receiving node relating to receiver-side buffering of received traffic data associated with time-aware scheduling across a cellular communication link;

DETAILED DESCRIPTION

Figure 1:
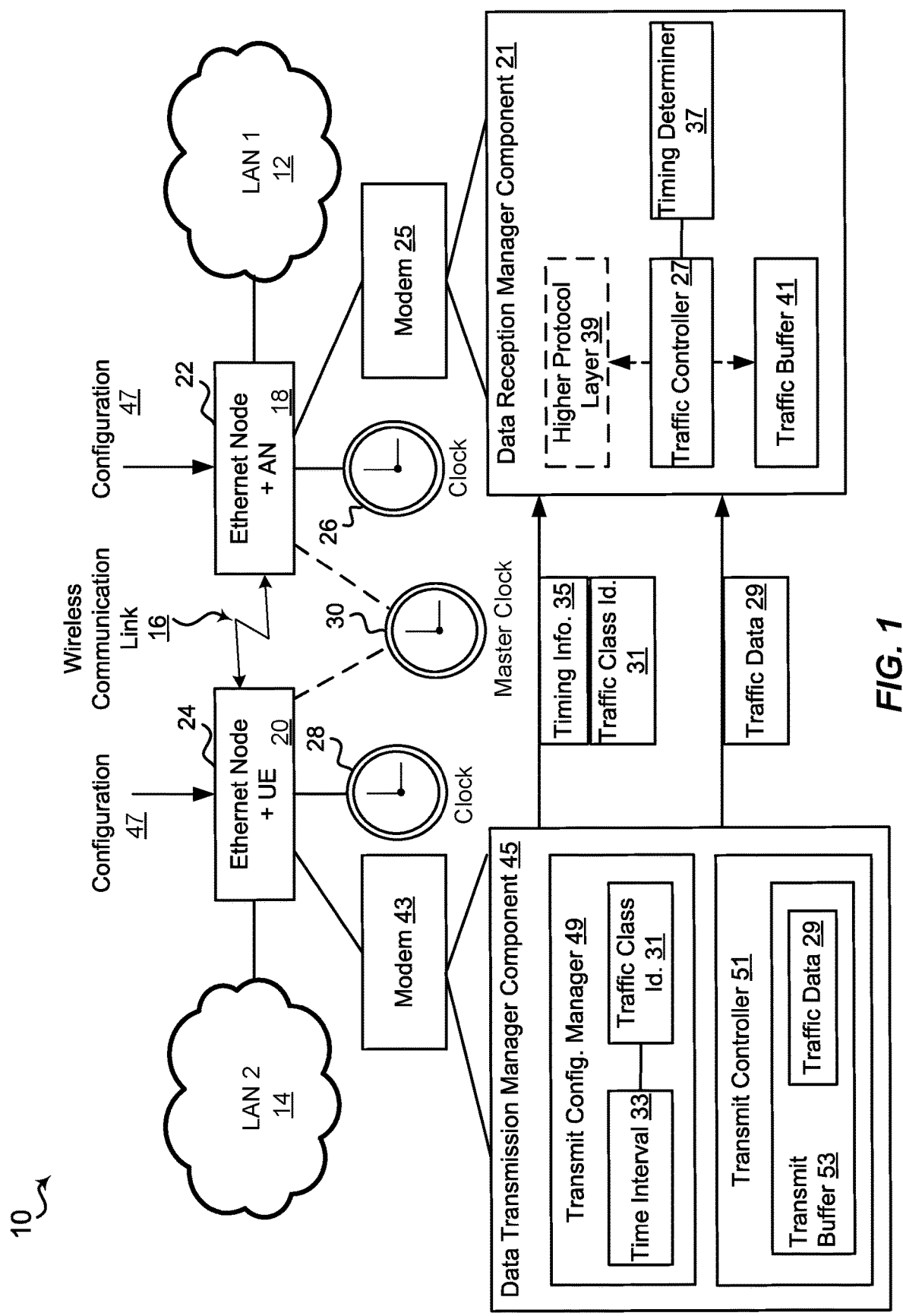
FIG. 1 is a schematic diagram of a wireless communication network including at least one user equipment (UE) and at least one access node (AN) configured to enable includes receiver-side buffering of received traffic data associated with time-aware scheduling across a cellular communication link.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to meeting the time-sensitive networking (TSN) time-aware schedule while preemptively transmitting frames over a cellular link. In particular, the disclosure includes receiver-side buffering of received traffic data associated with time-aware scheduling across a cellular communication link. In an implementation, for example, the described solutions may be used to replace wireline technologies with cellular technologies (e.g., 4G/LTE and 5G/new radio (NR)) in factory automation. As mentioned, time-aware scheduling reserves absolute periodic time intervals for the transmission of a particular traffic class on a link.

According to the present disclosure, in one implementation, a transmitting node informs a receiving node about designated time intervals, or a time indicator associated with a designated time interval (of which the receiving node may be unaware), and an associated traffic identifier so that the receiver can buffer preemptively arriving traffic data until an arrival of a next time interval (whether or not known to the receiving node) before the receiving node passes the traffic data on to upper layers. For instance, in order to avoid buffering an amount of traffic data beyond desired or available resources while waiting for arrival of a designated time window, or in order to efficiently use available bandwidth prior to the designated time window, the transmitting node may preemptively transmit traffic before its designated time window using a cellular interface supporting an Ethernet link. Sending traffic preemptively on the physical link, however, violates the time-aware schedule as traffic is transmitted outside its designated time interval. As such, the present disclosure enables the transmitting node to preemptively transmit the traffic data, while providing an indication to the receiving node to buffer the traffic data until an arrival of a next designated time interval to comply with the time-aware schedule. Depending on the scenario, the transmitting node can either a user equipment (UE) or an access node (AN), and the receiving node can be the opposite one of the UE or the AN.

Additional features of the present aspects are described in more detail below with respect to FIGS. 1-14.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in an example implementation, a system 10 may be configured to use Ethernet-based protocols over local area networks (LANs) 12 and 14. In one implementation, a first LAN 12 may be interconnected with a second LAN 14 via a cellular interface 16, e.g., a wireless communication link. The first LAN 12 and the second LAN 14 may refer to two different sections of the same LAN. In another example implementation, the first LAN 12 and the second LAN 14 may be different LANs. Either of the LANs may include a single Ethernet node. The cellular interface 16 may be supported between an Access Node (AN) 18 and User Equipment (UE) 20.

At least one of the AN 18 or the UE 20 includes a data reception manager component 21 (in this case, the AN 18) and at least the other one of the AN 18 or the UE 20 includes a data transmission manager component 45 (in this case, the UE 20), each of which is configured in a complimentary manner to enable a receiving node to support receiver-side buffering of received traffic data associated with time-aware scheduling across the cellular interface 16, e.g., the cellular communication link. It should be appreciated that both the AN 18 and the UE 20 may include both of the data reception manager component 21 and the data transmission manager component For example, a modem 25 of the AN 18 may execute the data reception manager component 21, which includes a traffic controller 27 configured to identify whether received traffic data 29 having a traffic class associated with a traffic class identifier 31 is received in or was transmitted in a time interval 33 for receiving data based on timing information 35 received for the traffic class identifier 31. For instance, the timing information 35 may include or otherwise explicitly or implicitly identify the time interval 33 for transmitting, or for not transmitting, or implicitly indicate a lack of a corresponding time interval 33, associated with the received traffic data 29 having the traffic class. It should be understood that the time interval 33 may be periodic, arbitrary, or a single time interval. Further, it should be understood that the receiving node (e.g., the AN 18 in this example) may be aware of the time interval 33 or may be completely unaware of the time interval 33 (e.g., just receiving timing information 35 that identifies how much longer to buffer the received traffic data 29).

The data reception manager component 21 may additionally include a timing determiner 37 in communication with the traffic controller 27 that identifies whether the received traffic data 29 was transmitted or received inside of time interval 33. As used herein, the traffic data 29 being "received" may refer to a time associated with any receiving processing step, e.g. after first transmission of data, after retransmissions, decoding and CRC check, successful security checks, reordering, frame or packet reassembly, etc. For instance, the timing determiner 37 may be in communication with an internal clock 26 that is synchronized to an internal clock 28 of the transmitting device (the UE 20 in this case). As such, the timing determiner 37 may compare the timing information 35, a value of the internal clock 26, and a timing of transmission or receipt of the traffic data 29 to determine if it is inside or outside of the time interval 33 for the corresponding traffic class. The timing determiner 37 may notify the traffic controller 27 of its determination. In response, when inside of the time interval 33 or when no time interval applies, the traffic controller 27 may forward the received traffic data 29 to one or more higher protocol layers 39. For example, the traffic controller 27 may be operating on the received traffic data 29 at a physical (PHY) protocol layer, and hence may pass the received traffic data 29 to a higher layer such as, but not limited to, a medium access control (MAC) protocol layer, a radio link control (RLC) protocol layer, etc. In contrast, when outside of the time interval 33, the traffic controller 27 may cause such preemptively transmitted traffic data 29 to be stored in a traffic buffer 41. Further, in this case, the traffic controller 27 may have the timing determiner 37 monitor for a next occurrence of the time interval 33, upon which the traffic controller 27 may then forward the received traffic data 29 stored in the traffic buffer 41 to one or more higher protocol layers 39. As such, the modem 25 operating the data reception manager component 21 and the traffic controller 27 can perform receiver-side buffering of the traffic data 29 received over the cellular interface 16 and associated with time-aware scheduling.

Correspondingly, a modem 43 of the UE 20 (in this case) may execute the data transmission manager component 45 to obtain a time-aware schedule configuration 47, generate the timing information 35, and transmit the timing information 35, the corresponding traffic class identifier 31, and the traffic data 29 to the receiving node, e.g., the AN 18 in this case. For example, the data transmission manager component 45 may include a transmit configuration manager 49 configured to determine a set of one or more time intervals 33 for one or more traffic class identifiers 31 based on the time-aware schedule configuration 47, and based thereon generate the timing information 35. Additionally, the data transmission manager component 45 may include a transmit controller 51 configured to receive traffic data 29, e.g., from an application or from another device, and store it in a transmit buffer 53 pending transmission according to the time-aware schedule configuration 47, if applicable to the traffic class associated with the traffic data 29. For example, the transmit buffer 53 may store the traffic data 29 until the traffic data 29 can be delivered to the receiver within a scheduled window.

In other aspects, the data reception manager component 21 and/or the data transmission manager component 45 may include additional functionalities and components related to performing receiver-side buffering of the traffic data 29 received over the cellular interface 16 and associated with time-aware scheduling, as discussed below.

In an implementation, the AN 18 may generally represent a gNB or an eNB, for instance. The AN 18 may reside on a first Ethernet node 22 connected to the first LAN 12 and the UE 20 may reside on a second Ethernet node 24 connected to the second LAN 14. The first Ethernet node 22 in which the AN 18 resides may include a User-Plane Function (UPF) or Gateway (GW) and/or other cellular core-network nodes. In another implementation, for example, the first Ethernet node 22 may not include the UPF, GW, and other cellular core-network nodes. The cellular interface 16 may support a frame structure defining, for example, a System Frame Number (SFN), Hyper Frame Number (HFN), subframe number, or similar frame number for synchronizing communication.

The first Ethernet Node 22 and the second Ethernet Node 24 may each hold a respective one of the internal clocks 26, 28, referred to as, for example, a LAN clock. The LAN clocks 26, 28 of each of the first Ethernet node 22 and the second Ethernet node 24 may be mutually synchronized via a synchronization procedure. Such synchronization may be performed, for example, by global navigation satellite system (GNSS) such as global positioning system (GPS), GLONASS, BeiDou Navigation Satellite System, or the like. In another example implementation, the synchronization may be performed via a Precision-Time-Protocol (PTP) such as defined by IEEE 1588 or IEEE 802.1AS. For example, in an implementation of a synchronization procedure using PTP via the cellular interface 16, the frame structure enforced by cellular technologies as well as lower layer mechanisms may be used to time-synchronize UE 20 and AN 18 with respect to this frame structure.

A PTP synchronization message can be initiated by a network node, e.g., first Ethernet Node 22 such as AN 18, to cross the cellular link toward the peer, e.g., second Ethernet Node 24 such as UE 20, the following procedure may be conducted. The first Ethernet Node 22 maps the time of its internal clock to the cellular frame structure. The first Ethernet Node 22 transmits this mapping together with an indicator of the time-synchronization protocol and the message content pertaining to this control over a control channel of the cellular link. The second Ethernet Node 24 receiving this information uses the mapping to synchronize its internal clock based on the cellular frame structure. The second Ethernet Node 24 uses this synchronized internal clock as well as the protocol indicator and the message content to further propagate PTP on other links. Frame structure synchronization between UE 20 and AN 18 can use existing cellular synchronization signals such as PSS/SSS, PRS and SRS and Timing Advance signaling. Accuracy can be enhanced by leveraging methods developed for OTDOA or UTDOA. Further, the mapping between frame structure and internal clock can be based on the time value of a particular frame boundary defined by SFN and HFN.

According to an example implementation, the LAN clocks 26, 28 of both of the Ethernet node 22 and Ethernet node 26 may optionally be time-synchronized with a master clock 30. In another example implementation, other nodes 22, 24 of the first LAN 12 and the second LAN 14 may be time-synchronized with the master clock 30. By using time synchronization of Ethernet Nodes in a LAN, the system 10 may be configured to reserve periodic time resources along a path in the LAN for a specific traffic class. As such, real-time traffic with stringent latency constraints may be capable of traveling along this path. The time-based resource reservation scheme may generally be referred to as time-aware scheduling, which has been defined in IEEE 802.1Qbv-2014. Time-aware scheduling may be used, for instance, for Time-Sensitive Networking (TSN).

Figure 2:
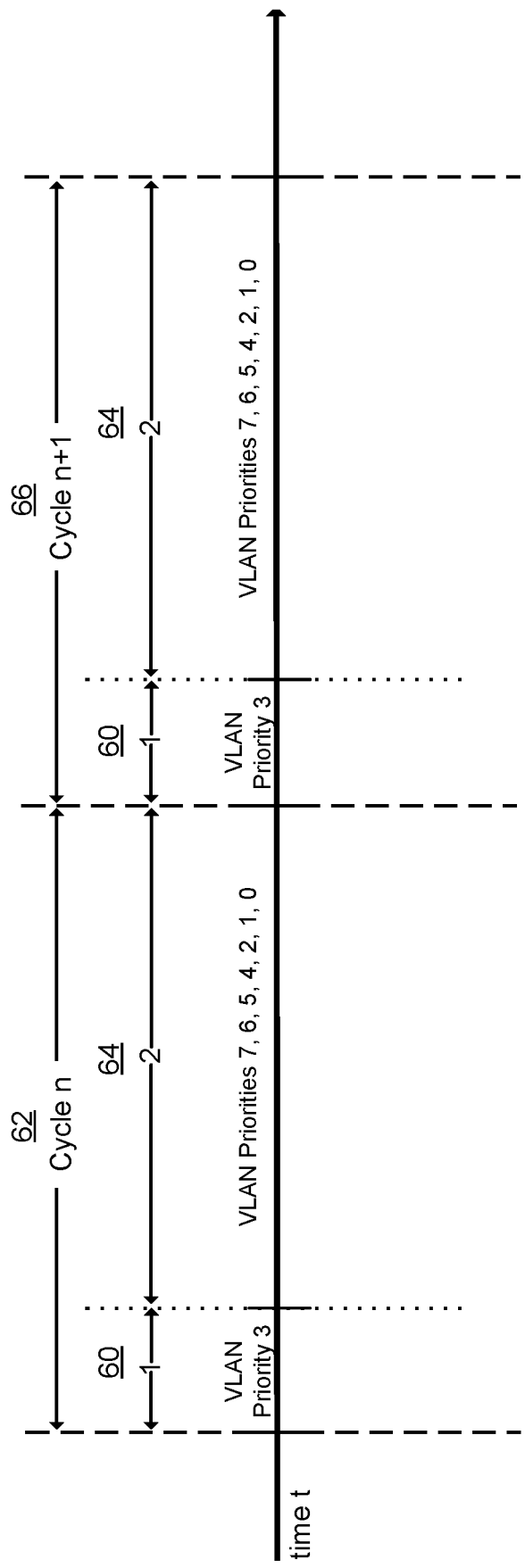
FIG. 2 is an example time-aware scheduling configuration including one or more period time intervals for one or more traffic classes of data.

Referring to FIG. 2, an example implementation of the time-aware schedule configuration 47 may include time-aware scheduling of a high-priority traffic type (VLAN priority 3) in a first time interval 60 of a periodic cycle $C_n$ 62. Other traffic of lower priority (VLAN priorities 7, 6, 5, 4, 2, 1, and 0) may be scheduled in the remaining time interval 64 of the cycle $C_n$ 62. Likewise, one or more subsequent periodic cycles $C_{n+1}$ 66 may have the same arrangement of the first time interval 60 and the remaining time interval 64.

Figure 3:
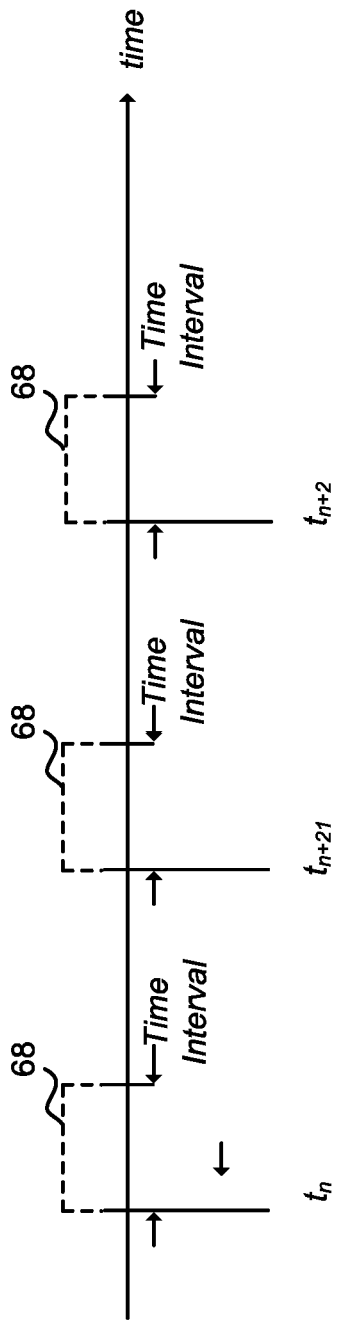
FIG. 3 is another example time-aware scheduling configuration including one or more period time intervals for one or more traffic classes of data.

Referring to FIG. 3, in another example, the time-aware schedule configuration 47 may be configured on a cellular link, and may specify time intervals 68 for high priority traffic as they is derived from a TSN configuration as shown in FIG. 2. For example, the time interval 68 may refer to an absolute time base used for reservation of resources for a specific type of traffic.

When using the cellular interface 16 to support an Ethernet link, the frame structure of the cellular link may be time-locked to the absolute time intervals defined by the time-aware schedule via a synchronization procedure, such as but not limited to using PTP as described above or via using channel estimation for per-tone continuous precoding in a downlink MIMO transmission.

For instance, in one implementation of a synchronization procedure using channel estimation for per-tone continuous precoding in a downlink MIMO transmission, as an example, when the AN has a layer (or stream) to transmit in the downlink, the AN may select a UE receive antenna. At the chosen UE receive antenna, there may be one dominant path in the channel impulse response (CIR) of the precoded channel. Further, the location of the dominant path of the precoded channel may be at the center of the time support of the PDP of the precoded channel. In an aspect, the center location may be more or less the same in the precoded channels for this layer at all of the UE receive antennas. Accordingly, the UE may estimate the location of the dominant path by applying IFFT-based channel estimation to the DMRS for the layer received at the UE receive antenna chosen for the layer. That is, the UE may receive signals from the AN and perform an FFT to extract the DMRS. Subsequently, the UE may perform an IFFT on the DMRS extracted from the FFT result to obtain the channel impulse response of the precoded channel. Based on the channel impulse response, the UE may determine the location of the dominant path. The UE may use the location of the dominant path to determine the time support of the PDPs of the precoded channel for this layer at all of the UE receive antennas. Via downlink control information (DCI), the AN may indicate to the UE the index of the UE receive antenna for the layer, where the measurement of the dominant path may take place. The UE may measure the delay spread, $\tau_{d,CRS}$, of the underlying propagation channel from the CRS, and use a value proportional to $\tau_{d,CRS}$ as the delay spread of the precoded channel. In an aspect, the value may be 1.5, such that the delay spread of the precoded channel may be assumed to be $1.5\tau_{d,CRS}$. Alternatively, using the SRS received in the UL, the AN may determine the delay spread of the precoded channel for each layer and indicate the delay spread information to the UE. By knowing the delay spread and the location of the dominant path, the UE may determine the time support of the PDP of the precoded channel. For example, the UE may determine that the location of the dominant path is at −50, and may determine that the delay spread for the propagation channel is 95. The delay spread for the precoded channel is 142.5 (95*1.5). Assuming −50 is at the center of the PDP, then the time support of the precoded channel may be in the approximate range of [−121, 21]. The UE may then use the determined time support of the precoded channel for performing channel estimation.

Aside from performing channel estimation of the uplink propagation channel using the SRS, the AN may use the SRS to determine the location of the first arriving path (FAP) of the UL propagation channel with respect to the start of the FFT window used by the AN for the demodulation of uplink signals. For example, the channel matrix observed at the k-th tone from the SRS may be given by:

$$H_k e^{-j2\pi k \Delta f T_{FAP,UL}}$$

Referring to the above equation, $\Delta f$ may refer to the tone spacing in Hertz (Hz) (e.g., 35 kHz), $T_{FAP,UL}$ may refer to the FAP location in seconds with respect to the start of the FFT window used by the AN for uplink signals, and $H_k$ may be the $N_r \times N_t$ matrix of the propagation channel with $T_{FAP,UL}=0$ (as such, the term $e^{-j2\pi k \Delta f T_{FAP,UL}}$ is a phase rotation/ramp that may arise when the FAP is not aligned with the start of the FFT window used by the AN; $H_k$ corresponds to the channel matrix when the FAP is aligned with the start of the FFT window). Regarding the $N_r \times N_t$ matrix, $N_r$ corresponds to the number of receive antennas at the UE, and $N_t$ corresponds to the number of transmit antennas at the AN. If $T_{FAP,UL}>0$, then the dominant path of the precoded channel may appear $T_{FAP,UL}$ seconds earlier than the FAP of the downlink propagation channel, when observed by the UE. If $T_{FAP,UL}<0$, then the dominant path of the precoded channel may appear $|T_{FAP,UL}|$ seconds later than the FAP of the downlink propagation channel, when observed by the UE. If $T_{FAP,UL}=0$, then the dominant path of the precoded channel may be aligned with the FAP of the downlink propagation channel.

At the output of the precoder, the AN may compensate for phase ramp on the precoded symbols, which may be caused by a non-zero $T_{FAP,UL}$. In an aspect, the precoded symbols for the k-th tone may be multiplied by $e^{-j2\pi k \Delta f T_{FAP,UL}}$ for purposes of phase ramp compensation. For example, by performing phase ramp compensation, the dominant path of the precoded channel may be aligned with the FAP of the DL propagation channel, instead of the dominant path preceding the FAP of the DL propagation channel. In this aspect, the dominant path of the precoded channel may become more aligned with the FAP of the downlink propagation channel, when the dominant path is received by the UE. As a result, the UE may use the location of the dominant path for downlink timing synchronization (e.g., use the location of the dominant path to determine the FAP of the DL propagation channel, which in turn is used in adjusting the position of the receiver FFT window in order to maximize the tone signal to interference and noise ratio (SINR)). For example, the FAP of the propagation channel may be difficult to locate because the strength of the FAP may be weak. Therefore, the location of the FAP may alternatively be determined using the location of the dominant path of the precoded channel, if the dominant path is aligned with the FAP.

As mentioned above, various problems exist with time-aware scheduling over a cellular interface. One problem, for example, is that time-aware scheduling increases buffer requirements on the transmitter side since traffic cannot be transmitted outside its designated time window. This problem exists even if link capacity is available. As such, the increased buffer requirements may create a burden for small sensors, for instance. To avoid one or more of these issues, the transmitting node may preemptively transmit data traffic, via a cellular interface supporting an Ethernet link, before its designated time window or time interval. When sending traffic preemptively on the physical link, however, the time-aware schedule is violated as traffic is forwarded outside its designated time interval.

As such, according to an example implementation of the present disclosure, a transmitting node may be configured to inform a receiving node about designated time intervals and an associated traffic identifier so that the receiver buffers preemptively arriving traffic until a next time interval arrives before passing the preemptively arriving traffic on to upper layers. Accordingly, the apparatus and methods off the present disclosure may satisfy the time-aware schedule, yet can utilize available bandwidth outside of the time interval to improve efficiency. As described herein, the transmitting node may be the UE or the AN, while the receiving node may be the opposite one of the UE or AN as compared to the transmitting node.

Figure 4:
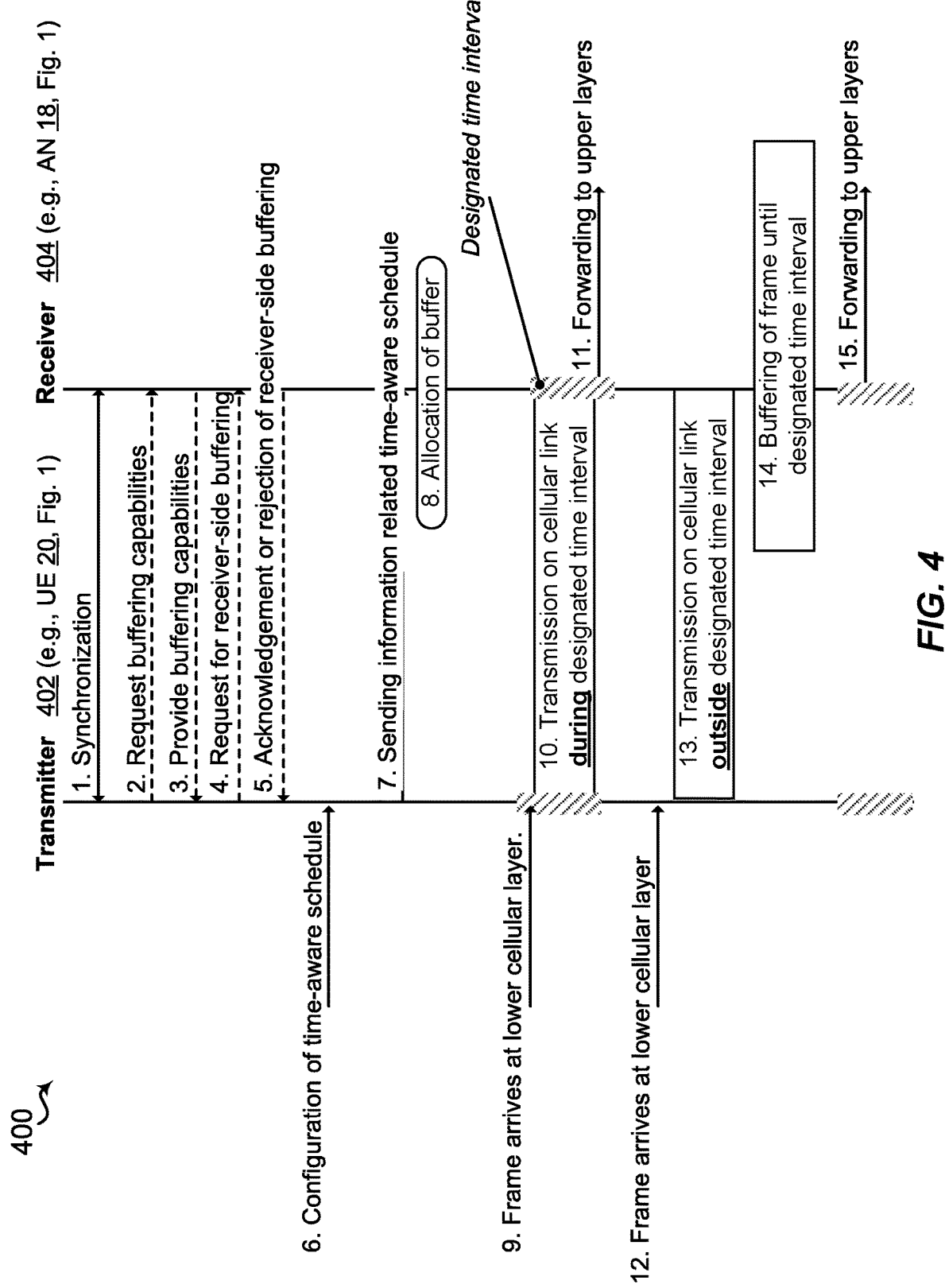
FIG. 4 is a message flow diagram of an example method of wireless communication in which a transmitting node informs a receiving node about timing information relating to receiver-side buffering of received traffic data associated with time-aware scheduling across a cellular communication link.

Referring to FIG. 4, in operation, one example implementation of a receiver-side buffering method 400 may be performed by a transmitter 402 (e.g., transmitting node such as UE 20 in FIG. 1) and a receiver 404 (e.g., a receiving node such as AN 18 in FIG. 1) sustaining a cellular interface 16 therebetween. Either of the nodes may be the AN 18 and the corresponding peer the UE 20. It may be appreciated that the transmitter 402 refers to the time-aware schedule, which is typically defined for a unidirectional traffic flow of a specific traffic class. Moreover, the below-described functions of the transmitter 402 may be performed by the data transmission manager component 45, or one of its subcomponents, operated by the modem 43 of UE 20 or the modem 25 of AN 18. Further, the below-described functions of the receiver 404 may be performed by the data reception manager component 21, or one of its subcomponents, operated by the modem 43 of UE 20 or the modem 25 of AN 18.

At step 1, the transmitter and receiver may sustain a cellular link with a synchronized frame structure. In an implementation, the internal clock and the frame structure of each node may be mutually locked, such as via a synchronization procedure as described herein.

At step 2, the transmitter may request capabilities about the buffering capabilities of the receiver.

At step 3, the receiver may provide such capabilities with or without request.

At step 4, the transmitter may request receiver-side buffering with respect to the time-aware schedule.

At step 5, the receiver may acknowledge this request or reject the request.

At step 6, the transmitter may receive a configuration of the time-aware schedule defining time intervals with respect to the clock of the transmitter for a designated traffic class.

At step 7, the transmitter extracts relevant information from the time-aware schedule and sends the information, e.g., timing information, to the receiver. The information may include at least one or a set of time intervals and a traffic class identifier. The information may also include a buffer size value. The information may further provide information that maps the time intervals defined by the time-aware schedule to equivalent intervals in the frame structure.

At step 8, the receiver may be configured to allocate a buffer for traffic transmitted outside a designated time interval. For example, the transmitter may send the receiver a request for receiver-side buffering including, for example, a requested buffer size.

At step 9, first data traffic of the designated traffic class may arrive at the transmitter side, e.g. arrives at a lower cellular protocol layer.

At step 10, according to an implementation, all or some of the first data traffic may be transmitted during one of the designated time intervals defined by the time-aware schedule.

At step 11, the receiver may decode the first data traffic, recognize that the first data traffic was sent during the designated time interval, and forward the first data traffic to upper layers. In an aspect, the forwarding may occur in response to recognizing that the first data traffic was sent during the designated time interval. The first data traffic may be forwarded without buffering, or without waiting for a particular time to forward the data.

Further, at step 12, second data traffic of the designated traffic class may arrive at the transmitter side.

At step 13, according to an implementation, all or some of the second data traffic may be transmitted outside the designated time intervals defined by the time-aware schedule.

At step 14, the receiver may decode the second data traffic sent outside the designed time interval, recognize that the second data traffic was sent outside the designated time interval, and therefore buffer the second data traffic.

At step 15, when the next designated time interval arrives for the designated traffic class, the receiver may forward the buffered second data traffic to the upper layers.

According to the above described example method 400, a determination of data buffering may be based on the transmission of the data with respect to a designated time interval. Alternatively, the determination of data buffering may also be based on the reception of the data with respect to the designated time interval. Other example implementations may be provided without losing generality.

In performing method 400, the procedural actions or functions and/or components performing such actions or functions on each of the transmitter 402 and receiver 404 may be summarized below.

For example, the transmitter 402 may be configured with the data transmission manager component 45, or one of its subcomponents, operated by the modem 43 of UE 20 or the modem 25 of AN 18 to perform one or more of these actions or functions.

The transmitter 402 may be configured to support a clock synchronized to a frame structure of a cellular link.

The transmitter 402 may be configured to receive information about buffering capabilities from the receiver and to determine that buffer capabilities are sufficient for receiver-side buffering.

The transmitter 402 may be configured to receive a time-aware schedule, including an indicator for the receiver 404, and time intervals referenced to a first clock together with a traffic class identifier referring to the respective time intervals. The indicator for the receiver 404 may be indicated via an IMSI, TMSI, RNTI, EMEI or a radio-network identifier. The traffic class identifier may be one of DRB, EPS bearer, PDN connection, PDU session, flow identifier (QFI), 5G QoS Identifier (5QI), Ethernet source or destination address, Ethernet type, VLAN tag, VLAN id, VLAN PCP, IP source or destination address, DSCP entry, UDP or TCP source or destination port number. Also, transmitter 402 may be configured to receive information about the traffic load associated with the traffic class identifier.

The transmitter 402 may be configured to determine that frame-preemption is supported for the wireless link.

The transmitter 402 may be configured to forward timing information related to the time-aware schedule to the receiver 404 indicated, together with the request for receiver-side buffering. The timing information may include a buffer side estimate, a traffic class identifier related to the cellular link such as a DRB Id, a QFI or 5QI, and translations of the time intervals of the time-aware schedule to another time base, e.g. such as the frame structure (where the transmitter 402 may be configured to generate such translations). The timing information may only include a subset of time intervals.

The transmitter 402 may be configured to receive an acknowledgement or a rejection to the request for receiver-side buffering.

If an acknowledgement was received, the transmitter 402 may be configured to send traffic data of the indicated traffic class outside the time intervals. The transmitter 402 may be configured to match traffic data sent outside the time intervals to the buffering capabilities sent by the receiver 404. The traffic data may be a MAC-layer transport block, a MAC-layer code block, an RLC PDU, a PDCP PDU, an Ethernet frame or an IP packet. The transmitter 402 may be configured to match the traffic data to the buffering capabilities on the receiver 404.

Correspondingly, the receiver 404 may be configured to support a clock synchronized to a frame structure of a cellular link.

The receiver 404 may be configured to send information about buffering capabilities to a peer, e.g., the transmitter 402, on the cellular link. The peer on the cellular link may be an AN 18 and the information may be sent based on a request by the peer.

The receiver 404 may be configured to receive timing information related to a time-aware schedule from the peer including time intervals referenced to a time base together with a traffic class identifier referring to the time intervals and an indicator for receiver-side buffering. The receiver side buffering requirements may be included in the receiver-side buffering request. The traffic class identifier may be related to the cellular link such as a DRB Id, a QFI or 5QI. The time base may refer to the frame structure or the first clock. In an aspect, the time base of the first clock may be referred to as a factory time master clock. Further, the timing information may only include a subset of time intervals.

The receiver 404 may be configured to acknowledge the receiver-side buffering request or reject the request, e.g., in a case where the receiver-side buffering requirements cannot be met.

The receiver 404 may be configured to receive traffic data of the traffic class outside the time intervals indicated, buffer the traffic, and forward the traffic to upper layers within the time intervals indicated in the timing information related to the time-aware schedule. The traffic data may include, but is not limited to, a MAC-layer transport block, a MAC-layer code block, an RLC PDU, a PDCP PDU, an Ethernet frame or an IP packet. The traffic data received may be matched to the buffering capabilities on the receiver 404.

Figure 5:
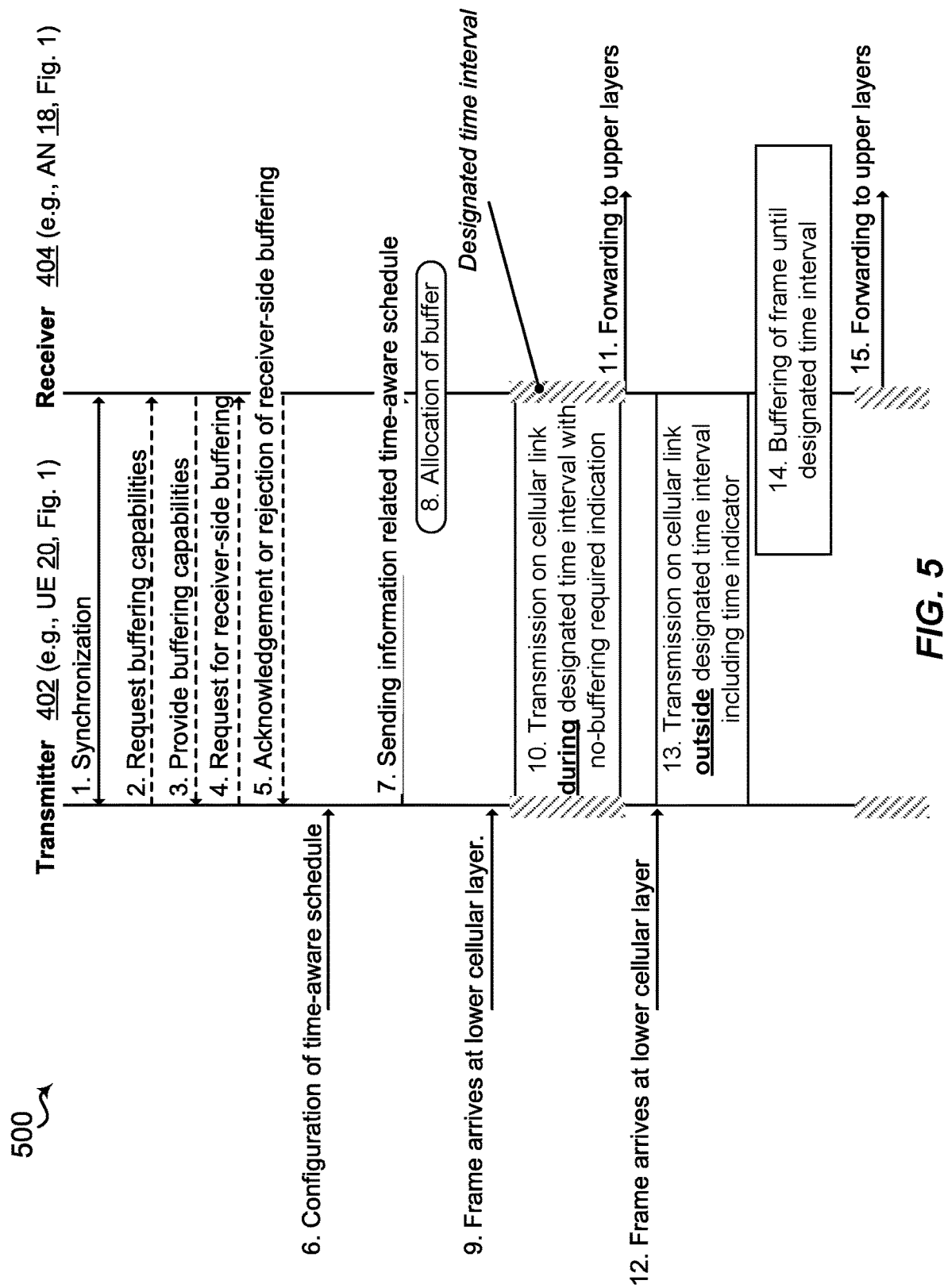
FIG. 5 is a message flow diagram of another example method of wireless communication in which a transmitting node informs a receiving node about timing information relating to receiver-side buffering of received traffic data associated with time-aware scheduling across a cellular communication link.

Referring to FIG. 5, in operation, another example implementation of a receiver-side buffering method 500 between the transmitter 402 and the receiver 404 sustaining the cellular interface 16 includes either of the nodes being the AN 18, and the corresponding peer being the UE 20. It may be appreciated that the transmitter 402 refers to the time-aware schedule, which is typically defined for a unidirectional traffic flow of a specific traffic class.

At step 1, the transmitter 402 and receiver 404 may sustain a cellular link with a synchronized frame structure. In an implementation, the internal clock and the frame structure of each node may be mutually locked, such as via a synchronization procedure as described herein.

At step 2, the transmitter 402 may request capability information about the buffering capabilities of the receiver 404.

At step 3, the receiver 404 may provide such capabilities with or without request.

At step 4, the transmitter 402 may request receiver-side buffering with respect to the time-aware schedule.

At step 5, the receiver 404 may acknowledge this request or reject it.

At step 6, the transmitter 402 may receive a configuration of the time-aware schedule defining time intervals with respect to the clock of the transmitter 402 for a designated traffic class.

At step 7, the transmitter 402 may extract relevant information from the time-aware schedule and sends the information to the receiver 404. The information includes at least a traffic class identifier and may also include a buffer size value.

At step 8, the receiver 404 may be configured to allocate a buffer for traffic received outside a designated time interval. For example, the transmitter 402 may send the receiver a request for receiver-side buffering including, for example, a requested buffer size.

At step 9, first data traffic of the designated traffic class arrives at the transmitter side, e.g., arrives at a lower cellular layer.

At step 10, according to an example implementation, all or some of the first data traffic may be transmitted during one of the designated time intervals defined by the time-aware schedule. The transmitter 402 may include a no-buffering-required indicator into the transmission.

At step 11, the receiver 404 may decode the first data traffic, recognize that the data was sent during the designated time interval since a no-buffering-required indicator is found or since no time-indicator is included, and forward the first data traffic to upper layers.

Further, at step 12, second data traffic of the designated traffic class may arrive at the transmitter side.

At step 13, according to an implementation, all or some of the second data traffic may be transmitted outside the designated time intervals defined by the time-aware schedule. The transmitter 402 may include a time indicator with the transmission of the traffic data. In this case, the time indicator may have a value based on the time until the next designated time interval.

At step 14, the receiver 404 may decode the second data traffic sent outside the designed time interval, recognize that the second data traffic was sent outside the designated time interval since the time-indicator is included, and buffer the data for a time frame that is derived from the time indicator.

At step 15, when the time frame indicated by the time indicator expires, the receiver 404 may forward the buffered second data traffic to upper layers.

According to this example implementation, a determination of data buffering may be based on the transmission of the data with respect to a designated time interval. Alternatively, the determination of data buffering may also be based on the reception of the data with respect to the designated time interval. Other example implementations may be provided without losing generality.

In performing method 500, the procedural actions or functions and/or components performing such actions or functions on each of the transmitter 402 and receiver 404 may be summarized below.

For example, the transmitter 402 may be configured to synchronize an internal clock to a frame structure of a cellular link.

The transmitter 402 may be configured to receive information about buffering capabilities from the receiver 404 and determine that the buffer capabilities are sufficient for receiver-side buffering.

The transmitter 402 may be configured to receive a time-aware schedule configuration, including an indicator for the receiver 404, a set of one or more time intervals referenced to a first clock together with one or more respectively correspondingly traffic class identifiers (identifying a traffic class) referring to the respective time intervals. The receiver 404 may be indicated via an IMSI, TMSI, RNTI, EMEI or a radio-network identifier. The traffic class identifier may be one of DRB, EPS bearer, PDN connection, PDU session, flow identifier (QFI), 5G QoS Identifier (5QI), Ethernet source or destination address, Ethernet type, VLAN tag, VLAN id, VLAN PCP, IP source or destination address, DSCP entry, UDP or TCP source or destination port number. Also, the transmitter 402 may be configured to receive information about the traffic load associated with the traffic class identifier The transmitter 402 may be configured to determine that frame-preemption or preemptive transmission of traffic data is supported for the wireless link, e.g., cellular interface 16, and by the receiver 404.

The transmitter 402 may be configured to forward timing information related to the time-aware schedule to the receiver 404 indicated together with a request for receiver-side buffering of preemptively-transmitted traffic data. The timing information may include a buffer size estimate, and/or a traffic class identifier, such as a DRB Id, a QFI or 5QI, related to the cellular interface 16.

The transmitter 402 may be configured to receive an acknowledgement or a rejection to the request for receiver-side buffering. If an acknowledgement was received, the transmitter 402 may be configured to send or wireless transmit the data traffic of the indicated traffic class outside the time intervals for the traffic class, where the transmission of the traffic data includes a time indicator (e.g., an absolute value or a relative value relative to internal clock 26) that identifies when the traffic data, e.g., data frame, must be buffered before forwarding to higher protocol layers. The time indicator may be sent on a control channel such as the PDCCH or PUCCH, or may be included in a MAC Control Element or another header. The transmitter 402 may be configured to match an amount of the traffic data sent outside the time intervals to the buffering capabilities sent by the receiver 404. The traffic data may include, but is not limited to, a MAC-layer transport block, a MAC-layer code block, an RLC PDU, a PDCP PDU, an Ethernet frame or an IP packet.

The transmitter 402 may be configured to send the traffic data of the indicated traffic class inside the time intervals with a no-buffering-required indicator. The no-buffering-required indicator may be implicit such as by omitting the time-indicator for buffering, or explicit such as by inserting a time-indicator where the time is set to zero.

The receiver 404 may be configured to support a clock synchronized to a frame structure of a cellular link.

The receiver 404 may be configured to send information about buffering capabilities to a peer, e.g., transmitter 402, on the cellular interface 16. The peer on the cellular link may be the AN 18 and the information may be sent based on a request by the peer.

The receiver 404 may be configured to receive timing information related to a time-aware schedule from the peer with a corresponding traffic class identifier, and optionally with an indicator or request for receiver-side buffering. The receiver-side buffering requirements may be included in the request and the traffic class identifier, such as a DRB Id, a QFI or 5QI, may be related to the cellular interface 16.

The receiver 404 may be configured to acknowledge the receiver-side buffering request or reject the request, e.g. in case the receiver-side buffering requirements cannot be met.

Further, the receiver 404 may be configured to receive traffic data of a traffic class, determine if buffering is required based on an indicator included in the traffic data, such as a time-indicator or a no-buffering-required indicator. The indicator may be retrieved from a control channel such as the PDCCH or PUCCH, or from MAC Control Element or another header.

The receiver 404 may be configured to buffer the traffic data for the time indicated by the time indicator, and then forward the traffic data to higher protocol layers. The traffic data may include but is not limited to a MAC-layer transport block, a MAC-layer code block, an RLC PDU, a PDCP PDU, an Ethernet frame or an IP packet. An amount of the traffic data receiving may be matched to the buffering capabilities on the receiver 404.

According to another example implementation of the present invention, the receiver 404 may receive the configuration containing information related to the time-aware schedule from a third node, such as an SDN-controller or a Centralized Network Controller. In another example implementation, the time-aware schedule may specify time intervals where transmissions should not occur rather than where transmissions should occur.

Figure 6:
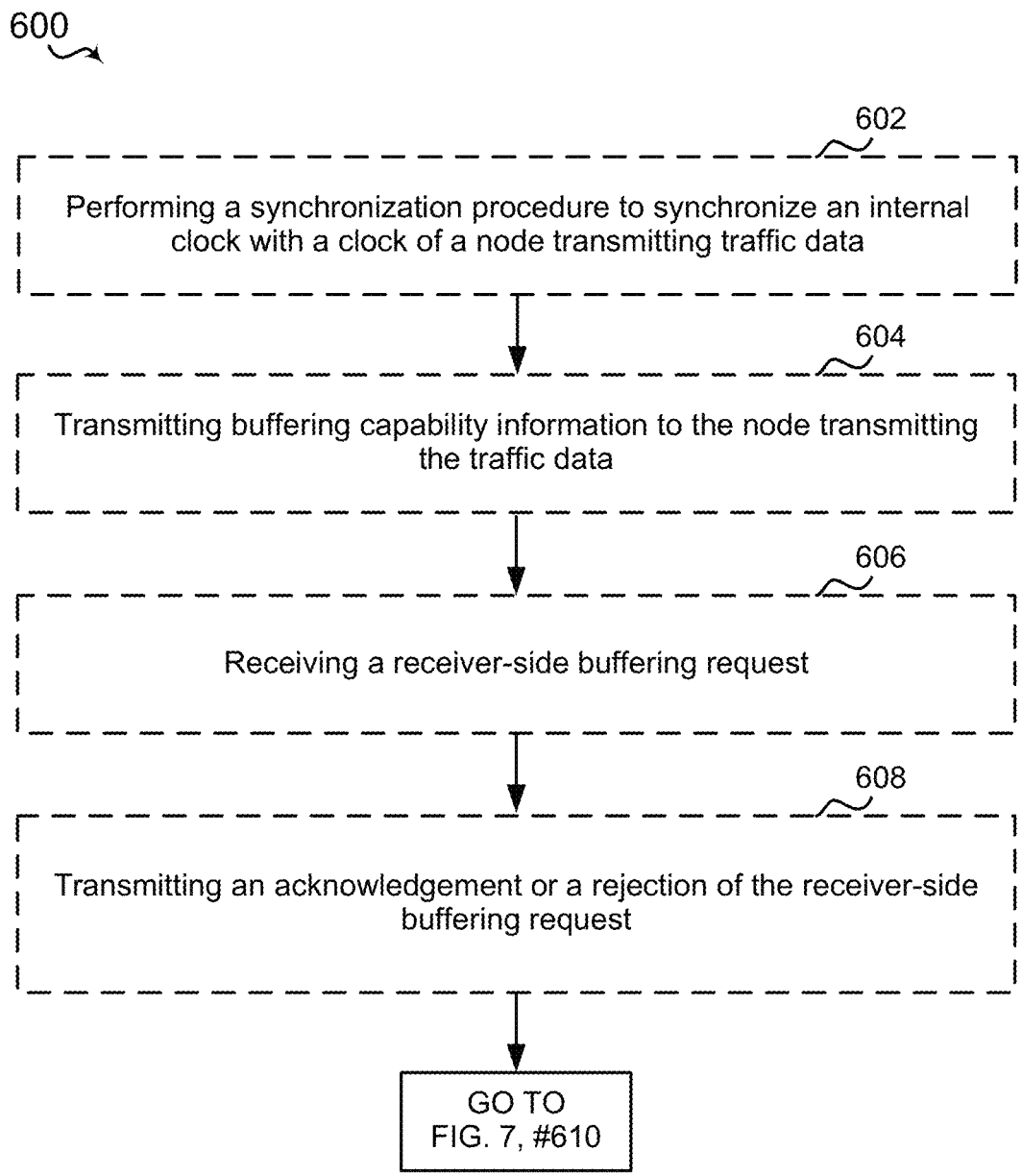
Figure 8:
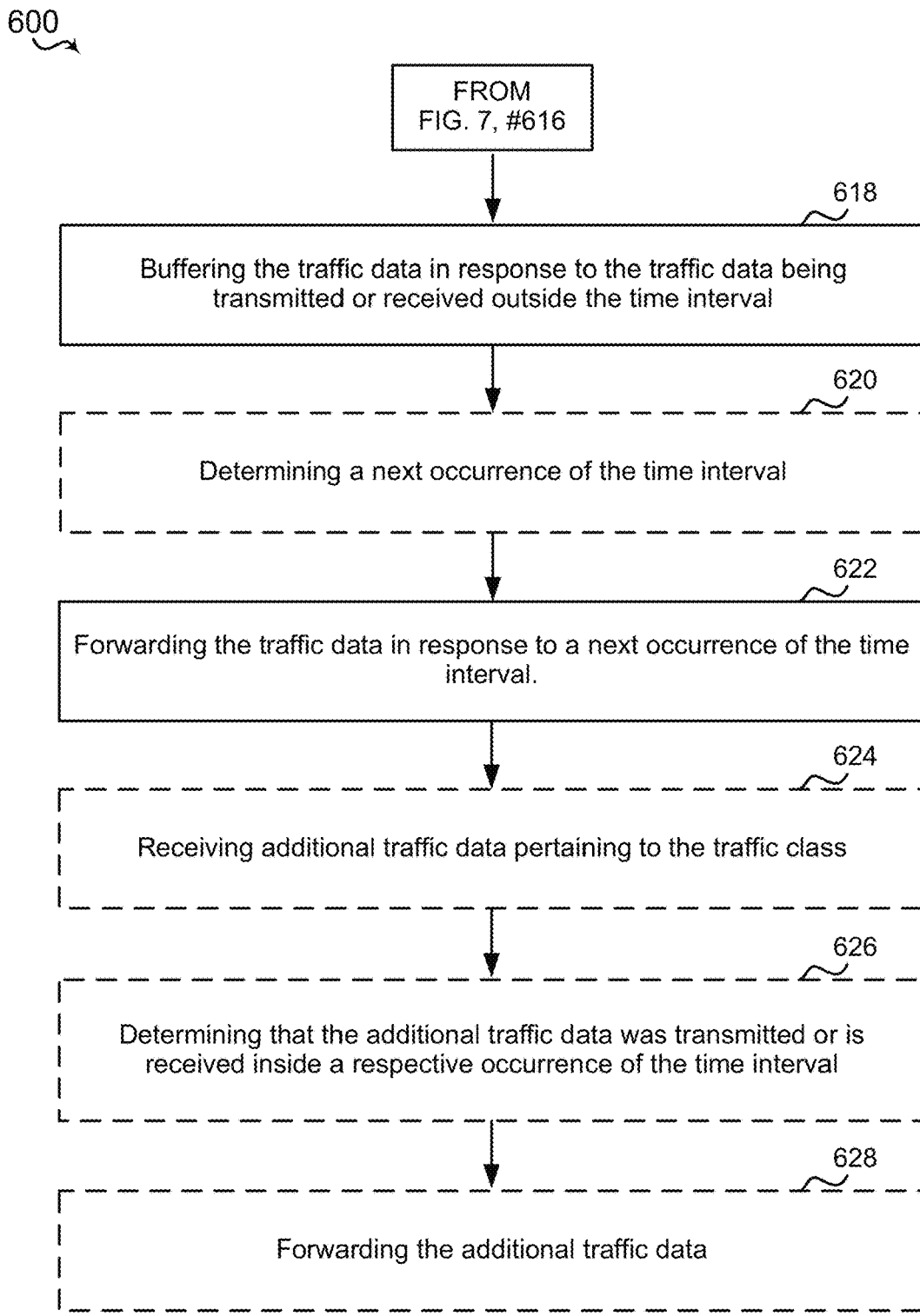

Referring to FIGS. 6-8, one example of a method 600 of wireless communication may be performed by a receiver node, such as receiver 404 include one of AN 18 or UE 20 acting as a receiving device. In particular, the actions of method 600 may be performed by data reception manager component 21, and/or one or more subcomponents or associated components describe herein, which may be executed by a processor or a modem one of AN 18 or UE 20. Portions of example implementation architectures for AN 18 and UE 20 are described above, and additional description is provided in the below discussion of method 600 in the context of an implementation on AN 18 based on the architecture described below and in the subsequent description of AN 18 in FIG. 13.

At 602, method 600 may optionally include performing a synchronization procedure to synchronize the synchronized clock with a clock of a node transmitting the traffic data. In this case, the node transmitting the traffic data may be considered a master clock 30. For example, in a factory scenario, the node transmitting the traffic data may maintain a factory time master clock. In another example, the transmitter may be synchronized with a UE (e.g., UE 20) and the UE may receive the offset between the clock of the node transmitting the data and the transmitter which allows the UE 20 to be synchronized with the master clock 30. Hence the time aware schedule can be in reference to either the factory time master clock or the transmitter. For example, in an aspect, AN 18 and/or processor 1312 and/or modem 25 and/or data reception manager component 21 may execute a synchronization component 50 to perform a synchronization procedure to synchronize the synchronized clock with a clock of the node transmitting the traffic data, as described herein. In an aspect, performing the synchronization procedure may include establishing a cellular link having a synchronized frame structure, and locking an internal clock with the frame structure to define the synchronized clock.

At 604, method 600 may optionally include transmitting buffering capability information to the node transmitting the traffic data. For example, in an aspect, AN 18 and/or processor 1312 and/or modem 25 and/or data reception manager component 21 may execute a buffer manager component 52 to transmit buffering capability information to the node transmitting the traffic data, e.g., transmitter 402 or UE 20. In an aspect, transmitting the buffering capability information may be in response to receiving a buffering capability request. Moreover, the buffering capability information may describe an amount of buffer available, e.g., a value of space in a memory, and/or a rate of buffering that may be accommodated by receiver 404 or AN 18.

At 606 and 608, method 600 may optionally include receiving a receiver-side buffering request, and transmitting an acknowledgement or a rejection of the receiver-side buffering request, respectively. For example, in an aspect, AN 18 and/or processor 1312 and/or modem 25 and/or data reception manager component 21 may execute buffer manager component 52 to receive a receiver-side buffering request, and to generate and transmit an acknowledgement or a rejection of the receiver-side buffering request, respectively, e.g., based on whether the parameters of the receiver-side buffering request are within or exceed the buffering capability of the receiver 404 or AN 18. For example, the receiver-side buffering request may include a request to buffer preemptively transmitted traffic data 29, and may further include a requested buffer size. Correspondingly, AN 18 and/or processor 1312 and/or modem 25 and/or data reception manager component 21 and/or traffic controller 27 and/or buffer manager component 52 may setup and allocate traffic buffer 41 having the requested buffer size.

Referring now to FIG. 7, at 610, method 600 may include receiving timing information corresponding to a traffic class identifier, wherein the timing information is associated with a time interval for communicating data of a traffic class corresponding to the traffic class identifier. For example, in an aspect, AN 18 and/or processor 1312 and/or modem 25 and/or data reception manager component 21 and/or traffic controller 27 may receive timing information corresponding to a traffic class identifier, wherein the timing information is associated with a time interval for communicating data of a traffic class corresponding to the traffic class identifier, as described herein.

In an aspect relating to method 400, at 610a, receiving the timing information may optionally include receiving identification of the time interval referenced to a synchronized clock prior to receiving the traffic data.

In an aspect relating to method 500, at 610b, receiving the timing information may optionally include receiving a time indicator included with the traffic data, wherein the time indicator identifies the next occurrence of the time interval.

At 612, method 600 may optionally include allocating a traffic data buffer in a memory in response to receiving the timing information corresponding to the traffic class identifier. For example, in an aspect, AN 18 and/or processor 1312 and/or modem 25 and/or data reception manager component 21 and/or traffic controller 27 and/or buffer manager component 52 may allocate a traffic buffer 41 in a memory in response to receiving the timing information corresponding to the traffic class identifier, as described herein. In some cases, the traffic buffer 41 may be partitioned into a plurality of different, independently-sized traffic class-specific buffers. For example, in some cases, AN 18 and/or processor 1312 and/or modem 25 and/or data reception manager component 21 and/or traffic controller 27 and/or buffer manager component 52 may allocate a traffic buffer 41 in response to receiving a request for receiver-side buffering including, for example, a requested buffer size.

At 614, method 600 may include receiving traffic data pertaining to the traffic class. For example, in an aspect, AN 18 and/or processor 1312 and/or modem 25 and/or data reception manager component 21 and/or traffic controller 27 may receive traffic data pertaining to the traffic class, such as via antennae 1365, RF front end 1388, transceiver 1302, and/or processor(s) 1312. In an aspect, receiving the traffic data comprises receiving at a first protocol layer, such as a PHY protocol layer.

At 616, method 600 may include determining that the traffic data was transmitted or is received outside the time interval. For example, in an aspect, AN 18 and/or processor 1312 and/or modem 25 and/or data reception manager component 21 and/or traffic controller 27 and/or timing determiner 37 may determine that the traffic data was transmitted or is received outside the time interval.

In an aspect relating to method 400, at 616a, determining that the traffic data was transmitted or is received outside the time interval may optionally be based on a value of the synchronized clock not matching a value of the time interval;

In an aspect relating to method 500, at 616b, determining that the traffic data was transmitted or is received outside the time interval may optionally be based on a value of the time indicator relative to a value of a synchronized clock that is synchronized to the time interval. Further, in this aspect, the value of the time indicator may be a relative time value or a specific time value. Also, in this aspect, receiving the timing information may further comprise receiving time-aware schedule information separate from and prior to receiving the time indicator and the traffic data, wherein the time-aware schedule information identifies at least the traffic class identifier of data subject to the time interval.

At 618, method 600 may include buffering the traffic data in response to the traffic data being transmitted or received outside the time interval. For example, in an aspect, AN 18 and/or processor 1312 and/or modem 25 and/or data reception manager component 21 and/or traffic controller 27 and/or buffer manager component 52 may buffer the traffic data in response to the traffic data being transmitted or received outside the time interval.

At 620, method 600 optionally may include determining the next occurrence of the time interval. For example, in an aspect, AN 18 and/or processor 1312 and/or modem 25 and/or data reception manager component 21 and/or traffic controller 27 and/or timing determiner 37 may determine the next occurrence of the time interval, as described herein. In an aspect relating to method 400, determining the next occurrence of the time interval may be based on the value of the synchronized clock matching the value of the time interval. In an aspect related to method 500, determining the next occurrence of the time interval may be based on the value of a synchronized clock and the value of the time indicator.

At 622, method 600 may include forwarding the traffic data in response to a next occurrence of the time interval. For example, in an aspect, AN 18 and/or processor 1312 and/or modem 25 and/or data reception manager component 21 and/or traffic controller 27 and/or timing determiner 37 and/or buffer manager component 52 may forward the traffic data in response to a next occurrence of the time interval, as described herein. In an aspect, forwarding the traffic data includes forwarding the traffic data to a second protocol layer, wherein the second protocol layer (e.g., a MAC protocol layer or other higher layer) is relatively higher in a protocol stack as compared to the first protocol layer (e.g., PHY layer).

At 624, method 600 optionally includes receiving additional traffic data pertaining to the traffic class. For example, in an aspect, AN 18 and/or processor 1312 and/or modem 25 and/or data reception manager component 21 and/or traffic controller 27 may receive the additional traffic data pertaining to the traffic class, as described herein. In an aspect relating to method 500, receiving the additional traffic data further comprises receiving the additional traffic data with an indicator. The indicator may be an implicit indicator or an explicit indicator. The indicator may indicate that the additional traffic data was transmitted or is received inside the respective occurrence of the time interval.

At 626, method 600 optionally includes determining that the additional traffic data was transmitted or is received inside a respective occurrence of the time interval. For example, in an aspect, AN 18 and/or processor 1312 and/or modem 25 and/or data reception manager component 21 and/or traffic controller 27 and/or timing determiner 37 may determine that the additional traffic data was transmitted or is received outside the time interval. In the aspect relating to method 500, determining that the additional traffic data was transmitted or is received inside the respective occurrence of the time interval may be based on the indicator.

At 628, method 600 optionally includes forwarding the additional traffic data. For example, in an aspect, AN 18 and/or processor 1312 and/or modem 25 and/or data reception manager component 21 and/or traffic controller 27 and/or timing determiner 37 may forward the additional traffic data, e.g., to a relatively higher protocol layer without buffering based on the transmission or receipt being inside the time interval for the traffic class associated with the additional traffic data.

Figure 9:
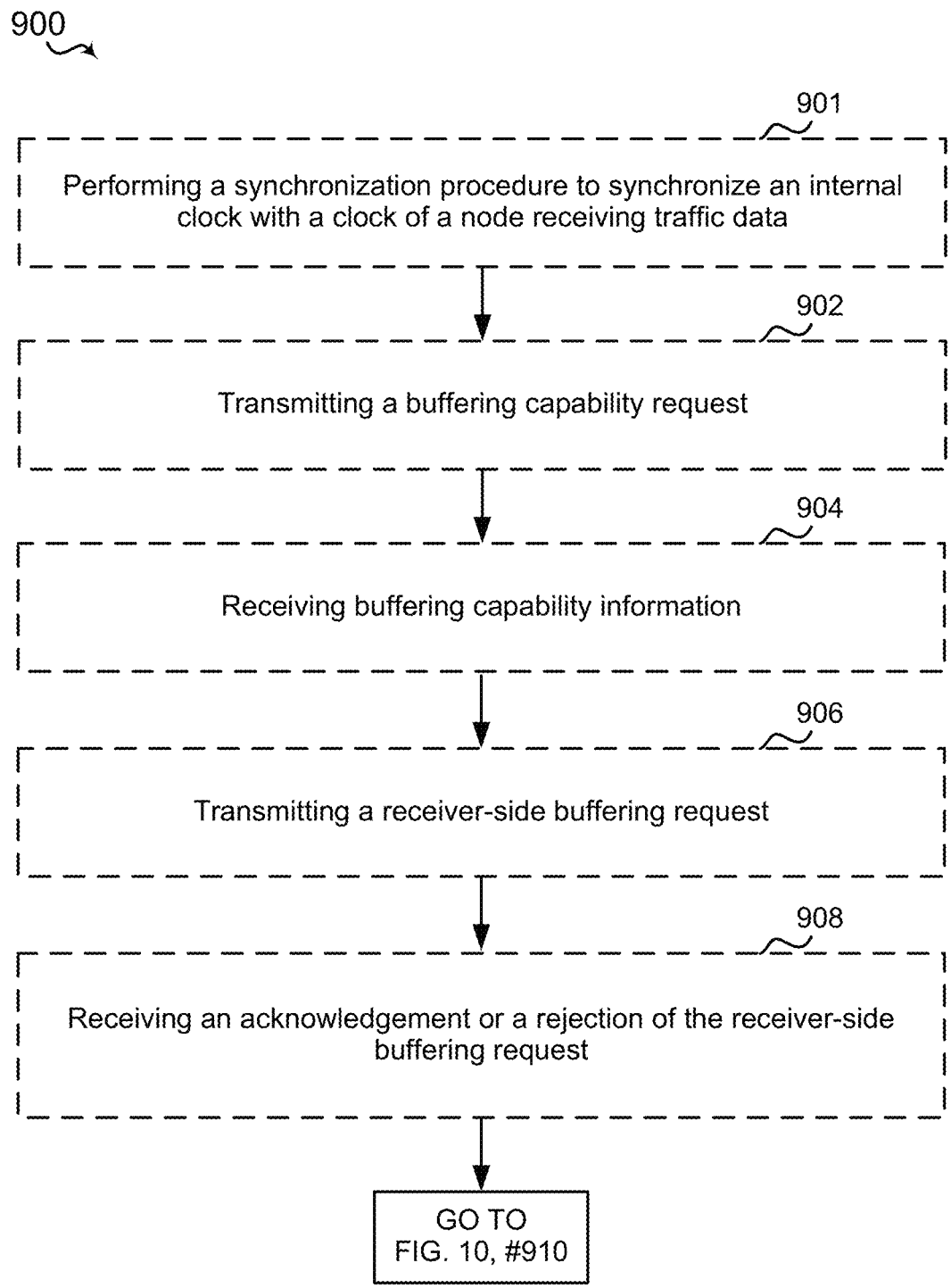
FIGS. 9-11 are flow diagrams of an example method performed by a transmitting node relating to receiver-side buffering of received traffic data associated with time-aware scheduling across a cellular communication link.
Figure 10:
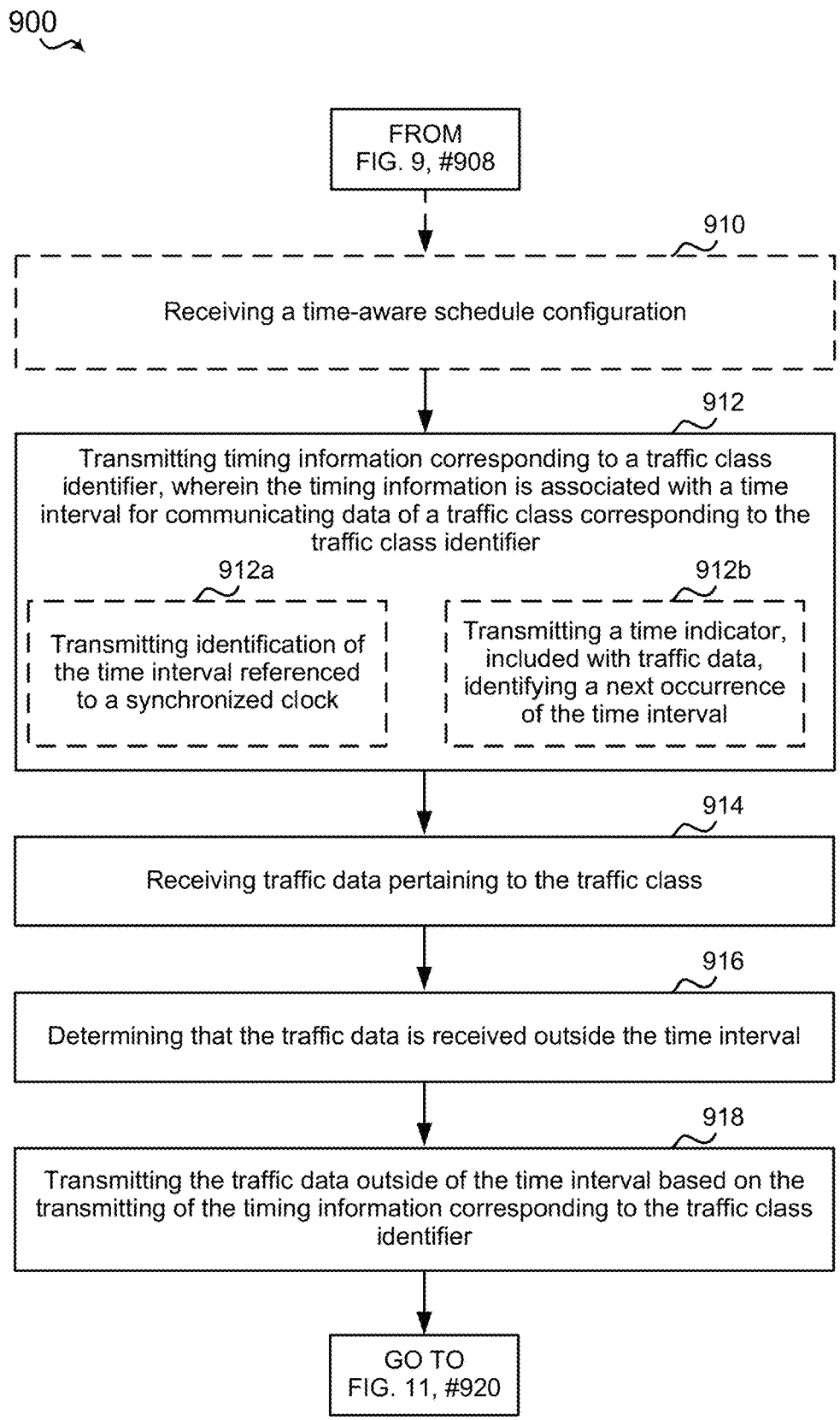
Figure 11:
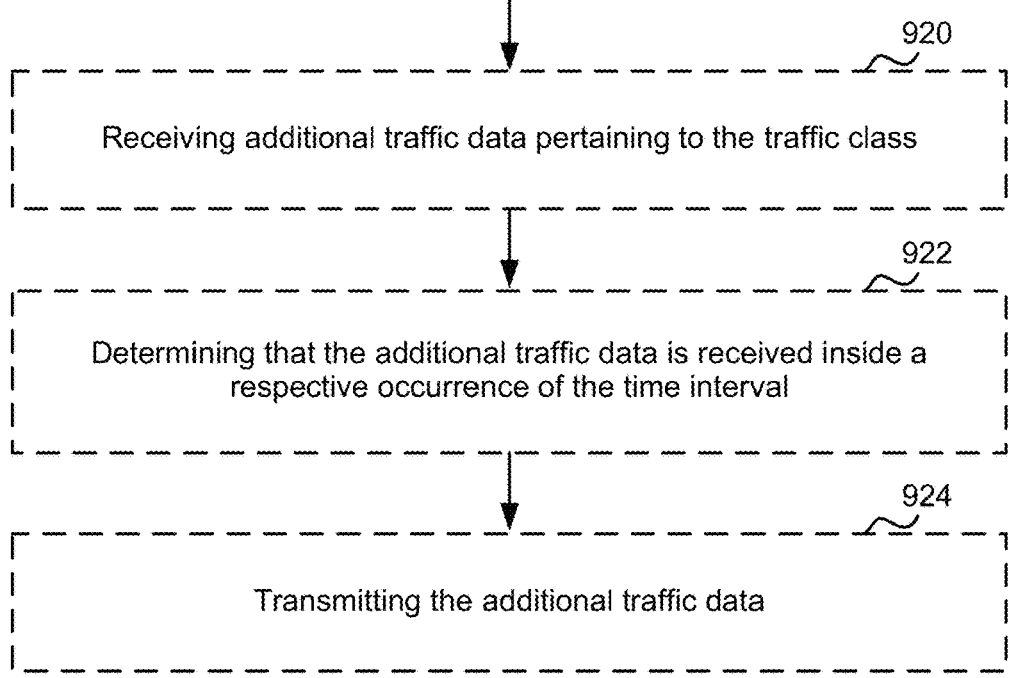

Referring to FIGS. 9-11, one example of a method 900 of wireless communication may be performed by a transmitter node, such as transmitter 402 including one of UE 20 or AN 18 acting as a transmitting device. In particular, the actions of method 600 may be performed by data transmission manager component 45, and/or one or more subcomponents or associated components described herein, which may be executed by a processor or a modem one of UE 20 or AN 18. Portions of example implementation architectures for UE 20 and AN 18 are described above, and additional description is provided in the below discussion of method 900 in the context of an implementation on AN 18 based on the architecture described below and in the subsequent description of UE 20 in FIG. 12. In an implementation, a synchronization component 58 may perform the synchronization actions described below. Also, in an implementation, the transmit configuration manager may perform the buffering capability-related procedures and/or the receiver-side buffering request procedures and/or the generation and transmission of the timing information discussed herein.

At 901, method 900 may optionally include performing a synchronization procedure to synchronize an internal clock with a clock of a node receiving the traffic data. In some implementations, for example, performing the synchronization procedure may include establishing a cellular link having a synchronized frame structure, and locking the internal clock with the frame structure to define a synchronized clock.

At 902 and 904, method 900 may optionally include transmitting a buffering capability request to a node that will be receiving traffic data, and/or receiving buffering capability information from the node receiving the traffic data. In some cases, the transmitter 402 may not request the buffering capability information but may receive the buffering capability information unprompted or based on other communications with the receiver 404. In other cases, receiving the buffering capability information is in response to receiving a buffering capability request.

At 906 and 908, method 900 may optionally include transmitting a receiver-side buffering request, and receiving an acknowledgement or a rejection of the receiver-side buffering request. In an aspect, for instance, the transmit configuration manager 49 may transmit the receiver-side buffering request and receive the acknowledgement or the rejection of the receiver-side buffering request. For example, the receiver-side buffering request may include a request to buffer preemptively transmitted traffic data 29 and may further include a requested buffer size, which may cause the receiving node to allocate traffic buffer 41 having the requested buffer size.

At 910, method 900 may optionally include receiving a time-aware schedule configuration. In an aspect, for example, the data transmission manager component 45 may receive the time-aware schedule configuration.

At 912, method 900 may include transmitting timing information corresponding to a traffic class identifier, wherein the timing information is associated with a time interval for communicating data of a traffic class corresponding to the traffic class identifier. In an aspect, for example, the transmit configuration manager 49 may transmit the timing information corresponding to the traffic class identifier 31. The timing information may be associated with the time interval 33 for communicating data of a traffic class corresponding to the traffic class identifier 31. In an aspect, transmitting the timing information is based on the time-aware schedule information received at 910.

At 912a, in an aspect, transmitting the timing information may optionally include transmitting identification of the time interval referenced to a synchronized clock prior to transmitting the traffic data.

At 912b, in an aspect, transmitting the timing information may optionally include transmitting a time indicator with the traffic data when transmitting the traffic data, wherein the time indicator identifies the next occurrence of the time interval. In an aspect, the value of the time indicator may be a relative time value or a specific time value.

In an aspect, transmitting the timing information may further include transmitting time-aware schedule information separate from and prior to transmitting the time indicator and the traffic data, wherein the time-aware schedule information identifies at least the traffic class identifier of data subject to the time interval.

In an aspect, transmitting the timing information corresponding to the traffic class identifier is configured to cause a node receiving the timing information to allocate a traffic data buffer in a memory. For example, the transmitter 402 may send the receiver 404 a request for receiver-side buffering including, for example, the timing information and a requested buffer size.

At 914, method 900 may include receiving traffic data pertaining to the traffic class. For example, the transmit controller 51 may receive the traffic data pertaining to the traffic class from a hardware component (e.g., a sensor), an application, or another device.

At 916, method 900 may include determining that the traffic data is received outside the time interval. For example, the transmit configuration manager 49 may compare a time that the traffic data is received to the time interval 33 for the traffic class identifier 31 to determine that the traffic data is received outside the time interval 33.

At 918, method 900 may include transmitting the traffic data outside of the time interval based on the transmitting of the timing information corresponding to the traffic class identifier. For example, the transmit controller 51 may transmit the traffic data 29 outside of the time interval 33 based on transmitting the timing information 35 corresponding to the traffic class identifier 31 at 912. In some aspects, transmitting the traffic data pertaining to the traffic class outside the time interval is in response to receiving the acknowledgement at 908.

At 920, method 900 may optionally include receiving additional traffic data pertaining to the traffic class. For example, the transmit controller 51 may receive the additional traffic data pertaining to the traffic class from a hardware component (e.g., a sensor), an application, or another device.

At 922, method 900 may optionally include determining that the additional traffic data is received inside a respective occurrence of the time interval. For example, the transmit configuration manager 49 may compare a time that the traffic data is received to the time interval 33 for the traffic class identifier 31 to determine that the traffic data is received inside the time interval 33.

At 924, method 900 may optionally include transmitting the additional traffic data inside of a respective time interval. For example, the transmit controller 51 may transmit the additional traffic data 29 inside of the respective time interval 33. In an aspect relating to method 500, for example, transmitting the additional traffic data may optionally include transmitting the additional traffic data with an indicator, the indicator being an implicit indicator or an explicit indicator that identifies that the additional traffic data was transmitted inside the respective time interval.

Figure 12:
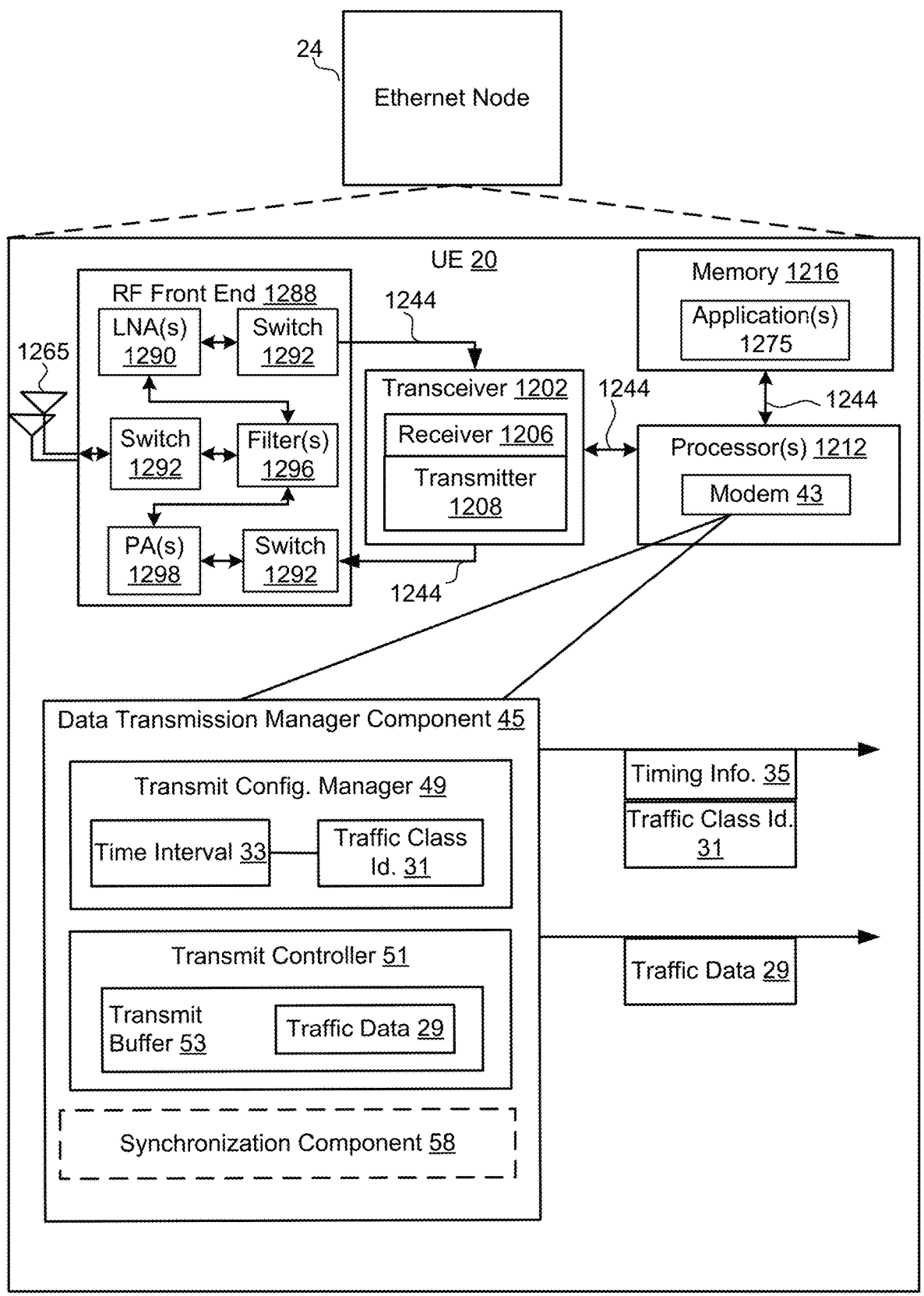
FIG. 12 is a schematic diagram of example components of the UE of FIG. 1.

Referring to FIG. 12, one example of an implementation of UE 20 may include a variety of components, some of which have already been described above, but including components such as one or more processors 1212 and memory 1216 and transceiver 1202 in communication via one or more buses 1244, which may operate in conjunction with modem 43 and data transmission manager component 45 to enable one or more of the functions described herein.

Further, the one or more processors 1212, modem 43, memory 1216, transceiver 1202, RF front end 1288 and one or more antennas 1286, may be configured to support voice and/or data calls (simultaneously or non-simultaneously) in one or more radio access technologies.

In an aspect, the one or more processors 1212 can include a modem 43 that uses one or more modem processors. The various functions related to data transmission manager component 45 may be included in modem 43 and/or processors 1212 and, in an aspect, can be executed by a single processor, while in other aspects, different ones of the functions may be executed by a combination of two or more different processors. For example, in an aspect, the one or more processors 1212 may include any one or any combination of a modem processor, or a baseband processor, or a digital signal processor, or a transmit processor, or a receiver processor, or a transceiver processor associated with transceiver 1202. In other aspects, some of the features of the one or more processors 1212 and/or modem 43 associated with data transmission manager component 45 may be performed by transceiver 1202.

Also, memory 1216 may be configured to store data used herein and/or local versions of applications 1275 or data transmission manager component 45 and/or one or more of its subcomponents being executed by at least one processor 1212. Memory 1216 can include any type of computer-readable medium usable by a computer or at least one processor 1212, such as random access memory (RAM), read only memory (ROM), tapes, magnetic discs, optical discs, volatile memory, non-volatile memory, and any combination thereof. In an aspect, for example, memory 1216 may be a non-transitory computer-readable storage medium that stores one or more computer-executable codes defining data transmission manager component 45 and/or one or more of its subcomponents, and/or data associated therewith, when UE 110 is operating at least one processor 1212 to execute data transmission manager component 45 and/or one or more of its subcomponents.

Transceiver 1202 may include at least one receiver 1206 and at least one transmitter 1208. Receiver 1206 may include hardware, firmware, and/or software code executable by a processor for receiving data, the code comprising instructions and being stored in a memory (e.g., computer-readable medium). Receiver 1206 may be, for example, a radio frequency (RF) receiver. In an aspect, receiver 1206 may receive signals transmitted by at least one base station 125. Additionally, receiver 1206 may process such received signals, and also may obtain measurements of the signals, such as, but not limited to, Ec/Io, SNR, RSRP, RSSI, etc. Transmitter 1208 may include hardware, firmware, and/or software code executable by a processor for transmitting data, the code comprising instructions and being stored in a memory (e.g., computer-readable medium). A suitable example of transmitter 1208 may including, but is not limited to, an RF transmitter.

Moreover, in an aspect, UE 20 may include RF front end 1288, which may operate in communication with one or more antennas 1265 and transceiver 1202 for receiving and transmitting radio transmissions, for example, wireless communications transmitted by at least one base station 125 or wireless transmissions transmitted by UE 20. RF front end 1288 may be connected to one or more antennas 1265 and can include one or more low-noise amplifiers (LNAs) 1290, one or more switches 1292, one or more power amplifiers (PAs) 1298, and one or more filters 1296 for transmitting and receiving RF signals.

In an aspect, LNA 1290 can amplify a received signal at a desired output level. In an aspect, each LNA 1290 may have a specified minimum and maximum gain values. In an aspect, RF front end 1288 may use one or more switches 1292 to select a particular LNA 1290 and its specified gain value based on a desired gain value for a particular application.

Further, for example, one or more PA(s) 1298 may be used by RF front end 1288 to amplify a signal for an RF output at a desired output power level. In an aspect, each PA 1298 may have specified minimum and maximum gain values. In an aspect, RF front end 1288 may use one or more switches 1292 to select a particular PA 1298 and its specified gain value based on a desired gain value for a particular application.

Also, for example, one or more filters 1296 can be used by RF front end 1288 to filter a received signal to obtain an input RF signal. Similarly, in an aspect, for example, a respective filter 1296 can be used to filter an output from a respective PA 1298 to produce an output signal for transmission. In an aspect, each filter 1296 can be connected to a specific LNA 1290 and/or PA 1298. In an aspect, RF front end 1288 can use one or more switches 1292 to select a transmit or receive path using a specified filter 1296, LNA 1290, and/or PA 1298, based on a configuration as specified by transceiver 1202 and/or processor 1212.

As such, transceiver 1202 may be configured to transmit and receive wireless signals through one or more antennas 1265 via RF front end 1288. In an aspect, transceiver may be tuned to operate at specified frequencies such that UE 20 can communicate with, for example, one or more base stations 125 or one or more cells associated with one or more base stations 125. In an aspect, for example, modem 43 can configure transceiver 1202 to operate at a specified frequency and power level based on the UE configuration of the UE 20 and the communication protocol used by modem 43.

In an aspect, modem 43 can be a multiband-multimode modem, which can process digital data and communicate with transceiver 1202 such that the digital data is sent and received using transceiver 1202. In an aspect, modem 43 can be multiband and be configured to support multiple frequency bands for a specific communications protocol. In an aspect, modem 43 can be multimode and be configured to support multiple operating networks and communications protocols. In an aspect, modem 43 can control one or more components of UE 20 (e.g., RF front end 1288, transceiver 1202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 20 as provided by the network during cell selection and/or cell reselection.

Figure 13:
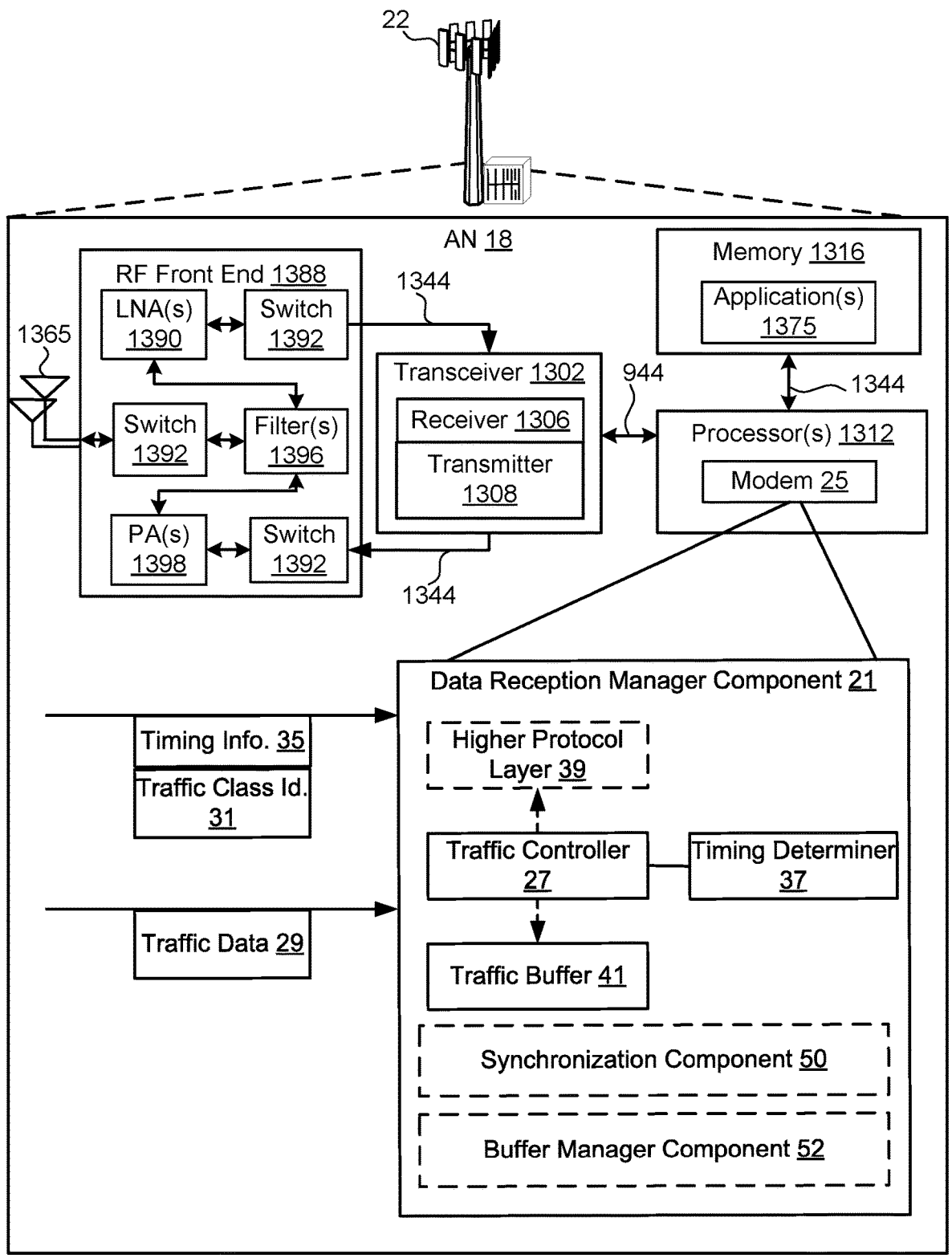
FIG. 13 is a schematic diagram of example components of the AN of FIG. 1.

Referring to FIG. 13, one example of an implementation of AN 18 may include a variety of components, some of which have already been described above, but including components such as one or more processors 1312 and memory 1316 and transceiver 1302 in communication via one or more buses 1344, which may operate in conjunction with modem 25 and data reception manager component 21 to enable one or more of the functions described herein.

The transceiver 1302, receiver 1306, transmitter 1308, one or more processors 1312, memory 1316, applications 1075, buses 1344, RF front end 1388, LNAs 1390, switches 1392, filters 1396, PAs 1398, and one or more antennas 1365 may be the same as or similar to the corresponding components of UE 110, as described above, but configured or otherwise programmed for base station operations as opposed to UE operations.

Figure 14:
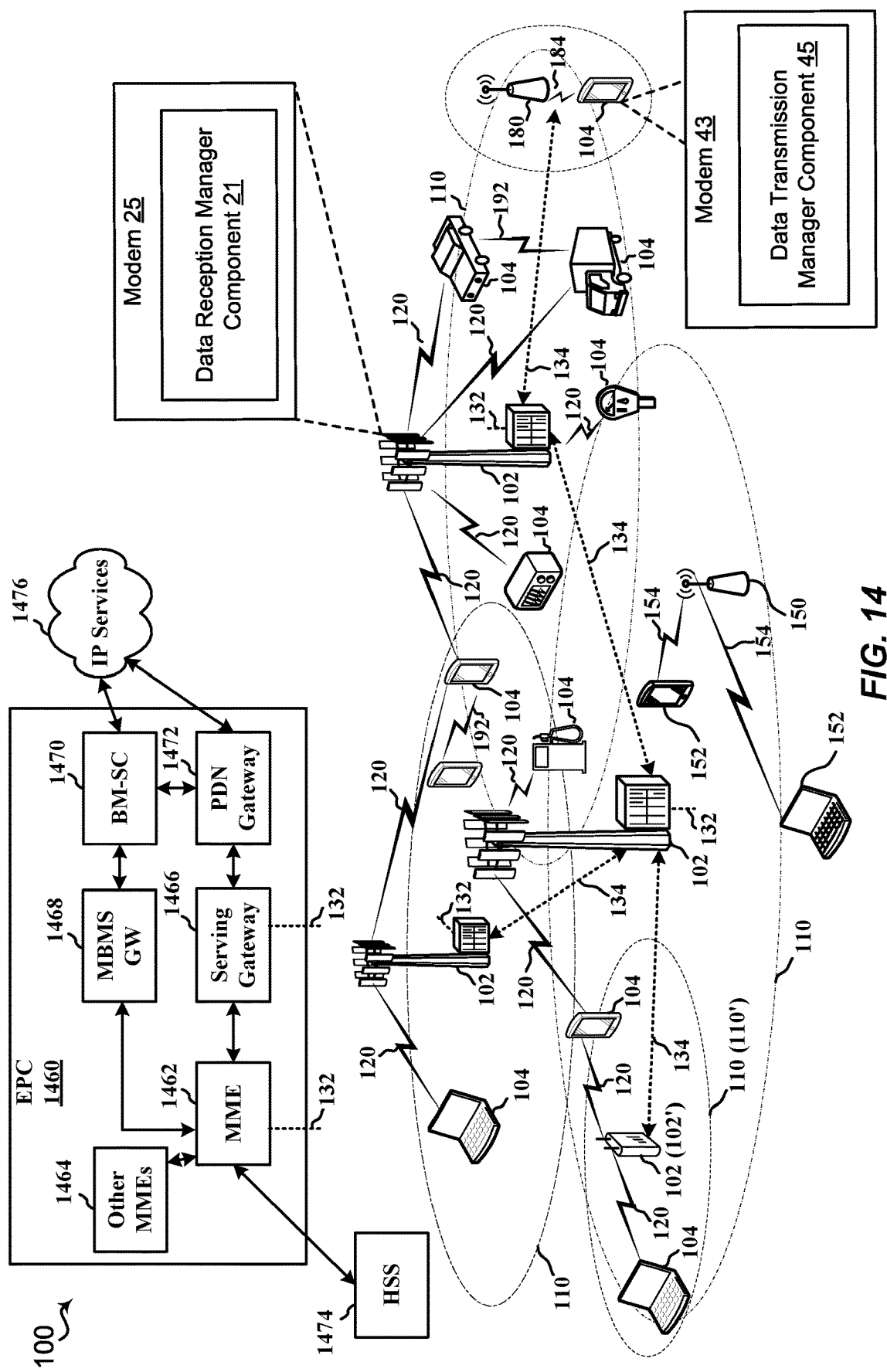
FIG. 14 is a schematic diagram of another wireless network in which aspects of receiver-side buffering of received traffic data associated with time-aware scheduling across a cellular communication link as described herein may be implemented.

Referring to FIG. 14, in accordance with various aspects of the present disclosure, aspect of receiver-side preemptive data buffering may be performed by one or more devices in an example wireless communication access network 100 that includes at least one UE 104 with a modem 43 having data transmission manager component 45 as described herein. Further, wireless communication access network 100, also referred to as a wireless wide area network (WWAN), includes at least one base station 102 with a modem 25 having data reception manager component 21 as described herein. UE 104 and base station 102 may be the same as or similar to or may include Ethernet node 22/UE 20/transmitter 402 and Ethernet node 24/AN 18/receiver 404 described above.

The one or more UEs 104 and/or the one or more base stations 102 may communicate with other UEs and/or other base stations via a core network such as an Evolved Packet Core (EPC) 160 or a 5G Core (5GC). The base stations 102 (collectively referred to as Evolved Universal Mobile Telecommunications System (UMTS) Terrestrial Radio Access Network (E-UTRAN)) interface with the core network (e.g., EPC 160 or 5GC) through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 and/or 5GC) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Y*x MHz (where x is a number of component carriers) used for transmission in each direction. The carriers may or may not be adjacent to or contiguous with each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as a mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 and/or 5GC for one or more UEs 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications at a receiving node device, comprising:
   receiving, from a transmitting node device, timing information corresponding to a traffic class identifier, wherein the timing information is associated with a time interval for receiving traffic data of a traffic class corresponding to the traffic class identifier;
   receiving, from the transmitting node device, the traffic data pertaining to the traffic class;
   determining that the received traffic data was transmitted by the transmitting node device or is received by the receiving node device outside the time interval for receiving traffic data of the traffic class corresponding to the traffic class identifier;
   buffering the received traffic data in response to the traffic data being transmitted by the transmitting node device or received by the receiving node device outside the time interval; and
   forwarding the traffic data in response to a next occurrence of the time interval.

2. The method of claim 1,
   wherein receiving the timing information comprises receiving identification of the time interval referenced to a synchronized clock prior to receiving the traffic data;
   wherein determining that the received traffic data was transmitted or is received outside the time interval is based on a value of the synchronized clock not matching a value of the time interval; and
   further comprising:
   determining the next occurrence of the time interval based on the value of the synchronized clock matching the value of the time interval.

3. The method of claim 1,
   wherein receiving the timing information comprises receiving a time indicator included with the received traffic data, wherein the time indicator identifies the next occurrence of the time interval;
   wherein determining that the received traffic data was transmitted or is received outside the time interval is based on a value of the time indicator relative to a value of a synchronized clock that is synchronized to the time interval;
   and further comprising:
   determining the next occurrence of the time interval based on the value of the synchronized clock and the value of the time indicator.

4. The method of claim 3, wherein the value of the time indicator is a relative time value or a specific time value.

5. The method of claim 3, wherein receiving the timing information further comprises receiving time-aware schedule information separate from and prior to receiving the time indicator and the traffic data, wherein the time-aware schedule information identifies at least the traffic class identifier of data subject to the time interval.

6. The method of claim 1, further comprising:
   receiving additional traffic data pertaining to the traffic class;
   determining that the additional traffic data was transmitted or is received inside a respective occurrence of the time interval; and
   forwarding the additional traffic data.

7. The method of claim 6, wherein receiving the additional traffic data further comprises receiving the additional traffic data with an indicator, and wherein determining that the additional traffic data was transmitted or is received inside the respective occurrence of the time interval is based on the indicator.

8. The method of claim 1,
   wherein receiving the traffic data comprises receiving the traffic data at a first protocol layer, and
   wherein forwarding the traffic data comprises forwarding the traffic data to a second protocol layer, wherein the second protocol layer is relatively higher in a protocol stack as compared to the first protocol layer.

9. The method of claim 1, further comprising performing a synchronization procedure to synchronize an internal clock with a clock of a node transmitting the traffic data.

10. The method of claim 9, wherein performing the synchronization procedure comprises:
    establishing a cellular link having a synchronized frame structure; and
    locking the internal clock with the synchronized frame structure to define a synchronized clock.

11. The method of claim 1, further comprising transmitting buffering capability information to the transmitting node device.

12. The method of claim 11, wherein transmitting the buffering capability information is in response to receiving a buffering capability request.

13. The method of claim 1, further comprising:
    receiving a receiver-side buffering request; and transmitting an acknowledgement or a rejection of the receiver-side buffering request,
wherein receiving the traffic data pertaining to the traffic class outside the time interval is in response to transmitting the acknowledgement.

14. The method of claim 1, further comprising:
receiving a receiver-side buffering request including a requested buffer size; and
allocating a buffer having the requested buffer size.

15. The method of claim 1, further comprising allocating a traffic data buffer in a memory in response to receiving the timing information corresponding to the traffic class identifier.

16. A receiving node device, comprising:
a memory; and
a processor in communication with the memory, wherein the processor is configured to:
receive, from a transmitting node device, timing information corresponding to a traffic class identifier, wherein the timing information is associated with a time interval for receiving data of a traffic class corresponding to the traffic class identifier;
receive, from the transmitting node device, traffic data pertaining to the traffic class;
determine that the received traffic data was transmitted by the transmitting node device or is received by the receiving node device outside the time interval for receiving traffic data of the traffic class corresponding to the traffic class identifier;
buffer the received traffic data in response to the traffic data being transmitted by the transmitting node device or received by the receiving node device outside the time interval; and
forward the received traffic data in response to a next occurrence of the time interval.

17. A method of wireless communications at a transmitting node device, comprising:
transmitting, to a receiving node device, timing information corresponding to a traffic class identifier, wherein the timing information is associated with a time interval for receiving traffic data of a traffic class corresponding to the traffic class identifier at the receiving node device;
receiving the traffic data pertaining to the traffic class;
determining that the traffic data is received by the transmitting node device outside the time interval for receiving traffic data of a traffic class corresponding to the traffic class identifier at the receiving node device; and
transmitting, to the receiving node device, the traffic data outside of the time interval in response to determining that the traffic data is received by the transmitting node device outside the time interval based on the transmitting of the timing information corresponding to the traffic class identifier.

18. The method of claim 17, further comprising:
receiving a time-aware schedule configuration,
wherein transmitting the timing information is based on the time-aware schedule configuration.

19. The method of claim 17, wherein transmitting the timing information comprises transmitting identification of the time interval referenced to a synchronized clock prior to transmitting the traffic data.

20. The method of claim 17, wherein transmitting the timing information comprises transmitting a time indicator with the traffic data when transmitting the traffic data, wherein the time indicator identifies a next occurrence of the time interval.

21. The method of claim 20, wherein a value of the time indicator is a relative time value or a specific time value.

22. The method of claim 20, wherein transmitting the timing information further comprises transmitting time-aware schedule information separate from and prior to transmitting the time indicator and the traffic data, wherein the time-aware schedule information identifies at least the traffic class identifier of data subject to the time interval.

23. The method of claim 17, further comprising:
receiving additional traffic data pertaining to the traffic class;
and transmitting the additional traffic data inside of a respective time interval.

24. The method of claim 23, wherein transmitting the additional traffic data further comprises transmitting the additional traffic data with an indicator identifying that the additional traffic data was transmitted inside the respective time interval.

25. The method of claim 17, further comprising performing a synchronization procedure to synchronize an internal clock with a clock of the receiving node device.

26. The method of claim 25, wherein performing the synchronization procedure comprises:
establishing a cellular link having a synchronized frame structure; and
locking the internal clock with the synchronized frame structure to define a synchronized clock.

27. The method of claim 17, further comprising:
transmitting a buffering capability request to the receiving node device; and
receiving buffering capability information from the receiving node device.

28. The method of claim 17, further comprising:
transmitting a receiver-side buffering request including a requested buffer size; and receiving an acknowledgement or a rejection of the receiver-side buffering request,
wherein transmitting the traffic data pertaining to the traffic class outside the time interval is in response to receiving the acknowledgement.

29. The method of claim 17, wherein transmitting the timing information corresponding to the traffic class identifier is configured to cause the receiving node device to allocate a traffic data buffer in a memory.

30. A transmitting node device, comprising:
a memory; and
a processor in communication with the memory, wherein the processor is configured to:
transmit, to a receiving node device, timing information corresponding to a traffic class identifier, wherein the timing information is associated with a time interval for receiving data of a traffic class corresponding to the traffic class identifier at the receiving node device;
receive traffic data pertaining to the traffic class;
determine that the traffic data is received by the transmitting node device outside the time interval for receiving traffic data of a traffic class corresponding to the traffic class identifier at the receiving node device; and
transmit, to the receiving node device, the traffic data outside of the time interval in response to determining that the traffic data is received by the transmitting node device outside the time interval based on the transmitting of the timing information corresponding to the traffic class identifier.

\* \* \* \* \*